United States Patent
Zhou et al.

(10) Patent No.: US 9,646,300 B1
(45) Date of Patent: May 9, 2017

(54) SYSTEMS AND METHODS FOR MOBILE APPLICATION, WEARABLE APPLICATION, TRANSACTIONAL MESSAGING, CALLING, DIGITAL MULTIMEDIA CAPTURE, PAYMENT TRANSACTIONS, AND ONE TOUCH SERVICE

(71) Applicants: WORLD AWARD ACADEMY, Austin, TX (US); WORLD AWARD FOUNDATION, Austin, TX (US); AMOBILEPAY, INC., Austin, TX (US)

(72) Inventors: Tiger T G Zhou, Tiburon, CA (US); Dylan T X Zhou, Belvedere Tiburon, CA (US); Andrew H B Zhou, Tiburon, CA (US); Zhou Tian Xing, Tiburon, CA (US); Mary M Z Xi, Boston, MA (US)

(73) Assignee: WORLD AWARD ACADEMY, WORLD AWARD FOUNDATION, AMOBILEPAY, INC., Austin, TX (US)

( * ) Notice: Subject to any disclaimer, the term of this patent is extended or adjusted under 35 U.S.C. 154(b) by 0 days.

(21) Appl. No.: 15/419,370

(22) Filed: Jan. 30, 2017

Related U.S. Application Data

(63) Continuation-in-part of application No. 15/343,227, filed on Nov. 4, 2016, and a continuation-in-part of
(Continued)

(51) Int. Cl.
*G06Q 20/32* (2012.01)
*G06Q 20/10* (2012.01)
(Continued)

(52) U.S. Cl.
CPC ..... *G06Q 20/3278* (2013.01); *G06Q 20/0855* (2013.01); *G06Q 20/123* (2013.01);
(Continued)

(58) Field of Classification Search
CPC ............. G06Q 20/3221; G06Q 20/102; G06Q 20/3278; G06Q 20/40145; G06Q 20/3821;
(Continued)

(56) References Cited

U.S. PATENT DOCUMENTS 6,633,223 B1 * 10/2003 Schenker ................. G07C 1/10
340/5.53
9,292,849 B2 * 3/2016 Kurian ................. G06Q 20/385
(Continued)

*Primary Examiner* — Daniel Walsh
(74) *Attorney, Agent, or Firm* — Georgiy L. Khayet

(57) ABSTRACT

A method for facilitating mobile device payments, multimedia capture, calling, and messaging may include providing a payment, multimedia capture, calling, and messaging interface on a display of a mobile and wearable device and sensing a haptic input of the user via the haptic control and the one touch service. In response to the haptic input, a cloud-based application associated with the mobile and wearable device may be activated. The haptic input may be analyzed to determine a duration of the haptic input. Based on the duration of the haptic input, an operation may be selected from the list of predetermined operations to be performed by the cloud-based application. The predetermined operations include at least a payment operation, a multimedia capture operation, a calling operation, and a messaging operation. The method may include operably connecting the mobile and wearable device to a cloud storage.

17 Claims, 12 Drawing Sheets

Related U.S. Application Data application No. 15/345,349, filed on Nov. 7, 2016, which is a continuation-in-part of application No. 14/957,644, filed on Dec. 3, 2015, now Pat. No. 9,489,671, which is a continuation-in-part of application No. 14/815,988, filed on Aug. 1, 2015, now Pat. No. 9,342,829, which is a continuation-in-part of application No. 13/760,214, filed on Feb. 6, 2013, now Pat. No. 9,016,565, which is a continuation-in-part of application No. 10/677,098, filed on Sep. 30, 2003, now Pat. No. 7,702,739.

(60) Provisional application No. 60/415,546, filed on Oct. 1, 2002.

(51) Int. Cl.

| | | |
|---|---|---|
| *G06Q 20/20* | (2012.01) | |
| *G06Q 20/38* | (2012.01) | |
| *G06Q 20/40* | (2012.01) | |
| *G06Q 20/08* | (2012.01) | |
| *G06Q 20/36* | (2012.01) | |
| *G06Q 20/12* | (2012.01) | |
| *G06Q 40/02* | (2012.01) | |
| *H04W 4/12* | (2009.01) | |
| *H04N 7/18* | (2006.01) | |
| *G06F 3/0482* | (2013.01) | |
| *G06F 3/0481* | (2013.01) | |
| *G06F 3/0484* | (2013.01) | |
| *G06F 3/0488* | (2013.01) | |

(52) U.S. Cl.
CPC ............ *G06Q 20/36* (2013.01); *G06Q 20/385* (2013.01); *G06Q 20/40145* (2013.01); *G06Q 40/025* (2013.01); *H04N 7/183* (2013.01); *H04W 4/12* (2013.01); *G06F 3/0482* (2013.01); *G06F 3/0488* (2013.01); *G06F 3/04817* (2013.01); *G06F 3/04842* (2013.01)

(58) Field of Classification Search
CPC ............ G06Q 20/351; G06Q 20/3829; G06Q 20/206; G06Q 30/0226; H04M 1/72583; H04L 67/10; H04B 1/385; H04W 4/04; G06K 7/10712
See application file for complete search history.

(56) References Cited

U.S. PATENT DOCUMENTS

| | | | | |
|---|---|---|---|---|
| 9,489,671 | B2 * | 11/2016 | Zhou | G06Q 20/3274 |
| 2002/0073025 | A1 * | 6/2002 | Tanner | G06F 9/4446 |
| | | | | 705/39 |
| 2003/0101137 | A1 * | 5/2003 | Wronski | G06Q 20/00 |
| | | | | 705/44 |
| 2007/0278290 | A1 * | 12/2007 | Messerges | G06Q 20/10 |
| | | | | 235/380 |
| 2010/0057553 | A1 * | 3/2010 | Ameiss | G06Q 20/387 |
| | | | | 705/14.32 |
| 2010/0082487 | A1 * | 4/2010 | Nelsen | G06Q 20/10 |
| | | | | 705/44 |
| 2011/0137748 | A1 * | 6/2011 | Baher | G06Q 20/12 |
| | | | | 705/26.41 |
| 2011/0302089 | A1 * | 12/2011 | McKenzie | G06Q 20/3274 |
| | | | | 705/75 |
| 2012/0006891 | A1 * | 1/2012 | Zhou | G06Q 20/3274 |
| | | | | 235/380 |
| 2014/0052607 | A1 * | 2/2014 | Park | G06Q 40/025 |
| | | | | 705/38 |
| 2014/0129422 | A1 * | 5/2014 | Zhou | G06Q 40/025 |
| | | | | 705/38 |
| 2014/0143037 | A1 * | 5/2014 | Zhou | G06Q 30/0226 |
| | | | | 705/14.17 |
| 2014/0195324 | A1 * | 7/2014 | Hage | G06Q 30/0228 |
| | | | | 705/14.29 |
| 2014/0249941 | A1 * | 9/2014 | Hicks | G06K 7/10821 |
| | | | | 705/17 |
| 2014/0279474 | A1 * | 9/2014 | Evans | G06Q 20/3572 |
| | | | | 705/41 |
| 2015/0058145 | A1 * | 2/2015 | Luciani | G06Q 20/3274 |
| | | | | 705/17 |
| 2016/0027005 | A1 * | 1/2016 | Kurian | G06Q 20/385 |
| | | | | 235/379 |
| 2016/0086161 | A1 * | 3/2016 | Zhou | G06Q 20/3274 |
| | | | | 705/44 |
| 2016/0162857 | A1 * | 6/2016 | Kurian | G06Q 20/385 |
| | | | | 235/379 |
| 2016/0162887 | A1 * | 6/2016 | Kurian | G06Q 20/385 |
| | | | | 705/41 |
| 2016/0335619 | A1 * | 11/2016 | Ce | G06Q 20/02 |

* cited by examiner

SYSTEMS AND METHODS FOR MOBILE APPLICATION, WEARABLE APPLICATION, TRANSACTIONAL MESSAGING, CALLING, DIGITAL MULTIMEDIA CAPTURE, PAYMENT TRANSACTIONS, AND ONE TOUCH SERVICE

CROSS-REFERENCES TO RELATED APPLICATIONS

This application is a continuation-in-part of U.S. patent application Ser. No. 15/343,227, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Nov. 4, 2016, U.S. patent application Ser. No. 15/345,349, entitled "SYSTEMS AND METHODS FOR MESSAGING, CALLING, DIGITAL MULTIMEDIA CAPTURE AND PAYMENT TRANSACTIONS", filed on Nov. 7, 2016; which is a continuation-in-part of U.S. patent application Ser. No. 14/957,644, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Dec. 3, 2015, which is a continuation-in-part of U.S. patent application Ser. No. 14/815,988, entitled "SYSTEMS AND METHODS FOR MOBILE APPLICATION, WEARABLE APPLICATION, TRANSACTIONAL MESSAGING, CALLING, DIGITAL MULTIMEDIA CAPTURE AND PAYMENT TRANSACTIONS", filed on Aug. 1, 2015, which claims priority to U.S. patent application Ser. No. 13/760,214, entitled "WEARABLE PERSONAL DIGITAL DEVICE FOR FACILITATING MOBILE DEVICE PAYMENTS AND PERSONAL USE", filed on Feb. 6, 2013, which is a continuation-in-part of U.S. patent application Ser. No. 10/677,098, entitled "EFFICIENT TRANSACTIONAL MESSAGING BETWEEN LOOSELY COUPLED CLIENT AND SERVER OVER MULTIPLE INTERMITTENT NETWORKS WITH POLICY BASED ROUTING", filed on Sep. 30, 2003, which claims priority to Provisional Application No. 60/415,546, entitled "DATA PROCESSING SYSTEM", filed on Oct. 1, 2002, which are incorporated herein by reference in their entirety.

FIELD

This application relates generally to data processing, and more specifically, to systems and methods for facilitating mobile device payments, multimedia capture, calling, and messaging via mobile and wearable devices.

BACKGROUND

Personal digital communication devices, such mobile and wearable devices, e.g., smartphones, are evolving rapidly and more and more people prefer using the mobile and wearable devices for a numerous purposes. When customers buy product items from various merchants in these merchants' retails environments, such as retail outlets, shopping centers, stores, etc., only a handful of payment methods is available to the customers. Typical examples include credit cards, debit cards, gift cards, checks, cash, and so forth. Each one of these payment methods has some drawbacks from cost and/or convenience perspectives. For example, credit cards bear substantial processing fees, while debit cards require availability of funds and sometimes involve surcharges as well. Checks and cash transactions are slow and require additional processing and/or handling. All these drawbacks interfere with retail transactions and add some level of dissatisfaction. To avoid these drawbacks, customers may perform payments using the mobile and wearable devices. The operations performed via mobile and wearable devices may include electronic commerce transactions, retail purchasing, micropayments, and other daily payments. Mobile payments may utilize credit cards, debit cards, gift cards, virtual currencies, and so forth. While mobile payments facilitate and stimulate the trade, the procedure of providing financial details and authenticating of identity may be tedious and time-consuming. Therefore, the convenience of mobile payments for daily micropayments is hindered.

One of the other purposes of the mobile and wearable devices is to capture details of everyday life, such as to record a photo, video, audio, and the like multimedia content. Typically, before capturing the multimedia content, a user has to select a particular type of the multimedia content to be captured. Such selection may take additional time, and a particular moment that the user intended to capture may be missed. Furthermore, switching between different modes of the personal digital communication devices any time when the user wants to capture another type of multimedia content may be annoying for the user.

Additionally, the mobile and wearable device may be used for many other purposes. However, a selection of a specific operation to be performed by the mobile and wearable device is conventionally made by opening, by the user, a menu interface of the mobile and wearable device and searching for an application responsible for performing the specific operation. Such selection may be time-consuming and may make the user to look through a list or a table of all available applications, most of which may be not currently needed for the user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The present disclosure is related to systems and methods for facilitating mobile device payments, multimedia capture, calling, and messaging via a mobile and wearable device. According to one embodiment of the disclosure, a system for facilitating mobile device payments, multimedia capture, calling, and messaging via a mobile and wearable device may include a processor, a sensing unit, and a database. The processor may be configured to provide a payment, multimedia capture, calling, and messaging interface on a display of the mobile and wearable device. The payment, multimedia capture, calling, and messaging interface may further be configured to receive a selection from a list of predetermined operations. The sensing unit in communication with the processor may be configured to sense a haptic input via a haptic control and one touch service. More specifically, the payment, multimedia capture, calling, and messaging interface may include the haptic control and the one touch service so that the sensing unit may sense a haptic input of a user. The haptic input may include a touch of the user to the haptic control and the one touch service. The processor may be configured to analyze the haptic input to determine a duration of the haptic input. The processor may be further configured to select an operation from the list of predetermined operations to be performed by a cloud-based application associated with the mobile and wearable device. The selection may be based on the duration of the haptic input. The predetermined operations may include at least a payment operation, a multimedia capture operation, a calling operation, and a messaging operation. The mobile and wearable device may be operable to perform each of the payment operation, the multimedia capture operation, the calling operation, and the messaging operation. The selecting of the payment operation may be associated with making a payment request by the user. In response to the haptic input, the processor may be configured to activate the cloud-based application. The cloud-based application may be running on the mobile and wearable device and may be associated with a cloud storage. The cloud-based application may be related to one or more dedicated folders provided on one or more client devices associated with the user, the one or more dedicated folders synchronizing across the one or more client devices, and contents of the one or more dedicated folders being accessible via a web resource and the cloud-based application. The cloud-based application may include a payment, multimedia capture, calling, and messaging application. The payment, multimedia capture, calling, and messaging application may be associated with an application protocol. The application protocol may be integrated into a communication platform associated with the mobile and wearable device. The processor may be further configured to operably connect the mobile and wearable device to the cloud storage. The cloud storage may be configured to store payment details of the user. The payment details may be provided by the user during a first launch of the cloud-based application on the mobile and wearable device. In response to the payment operation being selected, the processor may be configured to receive the payment details associated with the user from the cloud storage. The payment details may be used to perform a payment via the mobile and wearable device based on the payment request. The processor may be further configured to receive an indication that the user brings the mobile and wearable device in proximity to a merchant device associated with a merchant to make the payment to the merchant. The indication may be received based on sensing an interaction of the mobile and wearable device with the merchant device. The interaction may include at least a near field communication (NFC). The NFC may be used to pair the mobile and wearable device and the merchant device upon bringing the mobile and wearable device into proximity to the merchant device. The mobile and wearable device and the merchant device may be connected to a cloud network. The payment details and authorizing data associated with the user may be stored in the cloud storage associated with the cloud network. The processor may be configured to receive product data and merchant data. The product data and the merchant data may be provided by the merchant device based on the interaction. The product data may include at least a price of a product associated with the payment. The processor may be further configured to prompt the user to provide an authentication information. The prompting may include at least displaying an authentication button on the display of the mobile and wearable device. The processor may be configured to authenticate an identity of the user. The authentication may include at least a biometric authentication. The biometric authentication may include one or more of a fingerprint authentication, an iris pattern authentication, a heartbeat authentication, and a vein pattern identification. The vein pattern identification may be performed using scanning of one or more of the following: a palm vein pattern, a wrist vein pattern, a hand vein pattern, a leg vein pattern, a foot vein pattern, a neck vein pattern, and a head vein pattern. The fingerprint authentication may include scanning fingerprints of at least one finger of the user when the user touches one or more or the following: the display of the mobile and wearable device, a button of the mobile and wearable device, a rear panel of the mobile and wearable device, and the like. The fingerprint authentication may further include matching the fingerprints to one or more approved fingerprints. The one or more approved fingerprints may be stored in the cloud storage. The processor may be further configured to encrypt, upon the matching, the payment request associated with the payment operation to obtain an encrypted payment request. The encrypting of the payment request may include generating a one-time code. The one-time code may encode at least the payment details of the user, the product data, and the merchant data. The processor may further be configured to transmit the encrypted payment request to a financial organization. The processor may be further configured to receive, from the financial organization, a confirmation of the payment from the user to the merchant performed by the financial organization. The processor may be configured to store information associated with the payment to a database of the mobile and wearable device associated with the user. The payment operation may be authorized in part when a geographic location determined by the mobile and wearable device matches a geographic location of the merchant at a time of the selecting of the payment operation.

In response to the multimedia capture operation being selected, the processor may be further configured to capture multimedia by one or more sensors of the mobile and wearable device to obtain captured multimedia. The captured multimedia may be stored to the database the mobile and wearable device. The multimedia may include one of more of the following: a text, a photo, a sound, a video, an animation, a geographic location, and an object being captured by grabbing screenshots of the mobile and wearable device. The screenshots including links may include one or more of the following: a Shop Now link, a Book Now link, a Download link, a Learn More link, a Buy Now link, a Pay Now link, and a Sign Up link. The processor may be configured to select one or more multimedia types for recording from the captured multimedia based on predetermined rules associated with a predetermined time of the providing the haptic control and the one touch service by the user. The selection may be based on the duration of the haptic input associated with the multimedia capture operation. The processor may be further configured to store the one or more multimedia types into the database of the mobile and wearable device and the cloud storage.

In response to the calling operation being selected, the processor may provide a calling interface on the display of the mobile and wearable device to enable the user to provide, via the calling interface, a call recipient. Upon receipt of the call recipient, the processor may be further configured to perform a call with the call recipient via a data network.

In response to the messaging operation being selected, the processor may be configured to provide a messaging interface on the display of the mobile and wearable device to enable the user to provide, via the messaging interface, a message and a selection of a message recipient. Upon receipt of the message and the selection of the message recipient, the processor may send the message to the message recipient via the data network.

In another embodiment of the disclosure, a method for facilitating mobile device payments, multimedia capture, calling, and messaging via a mobile and wearable device is provided. The method may commence with providing a payment, multimedia capture, calling, and messaging interface on a display of the mobile and wearable device. The payment, multimedia capture, calling, and messaging interface may include a haptic control and a one touch service to sense a haptic input of a user. The payment, multimedia capture, calling, and messaging interface may be further configured to receive a selection from a list of predetermined operations. The method may include sensing the haptic input via the haptic control and the one touch service. The haptic input may include a touch of the user to the haptic control and the one touch service. Furthermore, the method may include analyzing the haptic input to determine a duration of the haptic input. The method may continue with selecting an operation from the list of predetermined operations to be performed by a cloud-based application associated with the mobile and wearable device. The selection may be based on the duration of the haptic input associated with the multimedia capture operation. The predetermined operations may include at least a payment operation, a multimedia capture operation, a calling operation, and a messaging operation. The mobile and wearable device may be operable to perform each of the payment operation, the multimedia capture operation, the calling operation, and the messaging operation. The selecting of the payment operation may be associated with making a payment request by the user. In response to the haptic input, the method may include activating the cloud-based application. The cloud-based application may be running on the mobile and wearable device and may be associated with a cloud storage. The cloud-based application may be related to one or more dedicated folders provided on one or more client devices associated with the user. The one or more dedicated folders may synchronize across the one or more client devices, and contents of the one or more dedicated folders being accessible via a web resource and the cloud-based application. The cloud-based application may include a payment, multimedia capture, calling, and messaging application. The payment, multimedia capture, calling, and messaging application may be associated with an application protocol. The application protocol may be integrated into a communication platform associated with the mobile and wearable device. The method may continue with operably connecting the mobile and wearable device to the cloud storage. The cloud storage may be configured to store payment details of the user. The payment details may be provided by the user during a first launch of the cloud-based application on the mobile and wearable device. In response to the payment operation being selected, the method including receiving the payment details associated with the user from the cloud storage. The payment details may be used to perform a payment via the mobile and wearable device based on the payment request. Furthermore, the method may include receiving an indication that the user brings the mobile and wearable device in proximity to a merchant device associated with a merchant to make the payment to the merchant. The indication may be received based on sensing an interaction of the mobile and wearable device with the merchant device. The interaction may include at least an NFC. The NFC may be used to pair the mobile and wearable device and the merchant device upon bringing the mobile and wearable device into proximity to the merchant device. The mobile and wearable device and the merchant device may be connected to a cloud network. The payment details and authorizing data associated with the user may be stored in the cloud storage associated with the cloud network. The method may continue with receiving product data and merchant data. The product data and the merchant data may be provided by the merchant device based on the interaction. The product data may include at least a price of a product associated with the payment. The method may include prompting the user to provide an authentication information. The prompting may include at least displaying an authentication button on the display of the mobile and wearable device. Furthermore, the method may include authenticating an identity of the user. The authentication may include at least a biometric authentication. The biometric authentication may include one or more of a fingerprint authentication, an iris pattern authentication, a heartbeat authentication, and a vein pattern identification. The vein pattern identification may be performed using scanning of one or more of the following: a palm vein pattern, a wrist vein pattern, a hand vein pattern, a leg vein pattern, a foot vein pattern, a neck vein pattern, and a head vein pattern. The fingerprint authentication may include scanning fingerprints of at least one finger of the user when the user touches one or more or the following: the display of the mobile and wearable device, a button of the mobile and wearable device, a rear panel of the mobile and wearable device, and the like. The fingerprint authentication may further include matching the fingerprints to one or more approved fingerprints. The one or more approved fingerprints may be stored in the cloud storage. The method may continue with encrypting, upon the matching, the payment request associated with the payment operation to obtain an encrypted payment request. The encrypting of the payment request may include generating a one-time code. The one-time code may encode at least the payment details of the user, the product data, and the merchant data. Furthermore, the method may include transmitting the encrypted payment request to a financial organization. The method may continue with receiving, from the financial organization, a confirmation of the payment from the user to the merchant performed by the financial organization. The method may include storing information associated with the payment to a database of the mobile and wearable device associated with the user. The payment operation may be authorized in part when a geographic location determined by the mobile and wearable device matches a geographic location of the merchant at a time of the selecting of the payment operation.

In response to the multimedia capture operation being selected, the method may include capturing multimedia by one or more sensors of the mobile and wearable device to obtain captured multimedia. The captured multimedia may be stored to the database the mobile and wearable device. The multimedia may include one of more of the following: a text, a photo, a sound, a video, an animation, a geographic location, and an object being captured by grabbing screenshots of the mobile and wearable device. The screenshots including links may include one or more of the following: a Shop Now link, a Book Now link, a Download link, a Learn More link, a Buy Now link, a Pay Now link, and a Sign Up link. The method may continue with selecting one or more multimedia types for recording from the captured multimedia based on predetermined rules associated with a predetermined time of the providing the haptic control and the one touch service by the user. The selection may be based on the duration of the haptic input associated with the multimedia capture operation. The method may include storing the one or more multimedia types into the database of the mobile and wearable device and the cloud storage.

In response to the calling operation being selected, the method may include providing a calling interface on the display of the mobile and wearable device, to enable the user to provide, via the calling interface, a call recipient. Upon receipt of the call recipient, the method may continue with performing a call with the call recipient via a data network.

In response to the messaging operation being selected, the method may include providing a messaging interface on the display of the mobile and wearable device to enable the user to provide, via the messaging interface, a message and a selection of a message recipient. Upon receipt of the message and the selection of the message recipient, the method may continue with sending the message to the recipient via the data network.

In further exemplary embodiments, modules, subsystems, or devices can be adapted to perform the recited steps. Other features and exemplary embodiments are described below.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
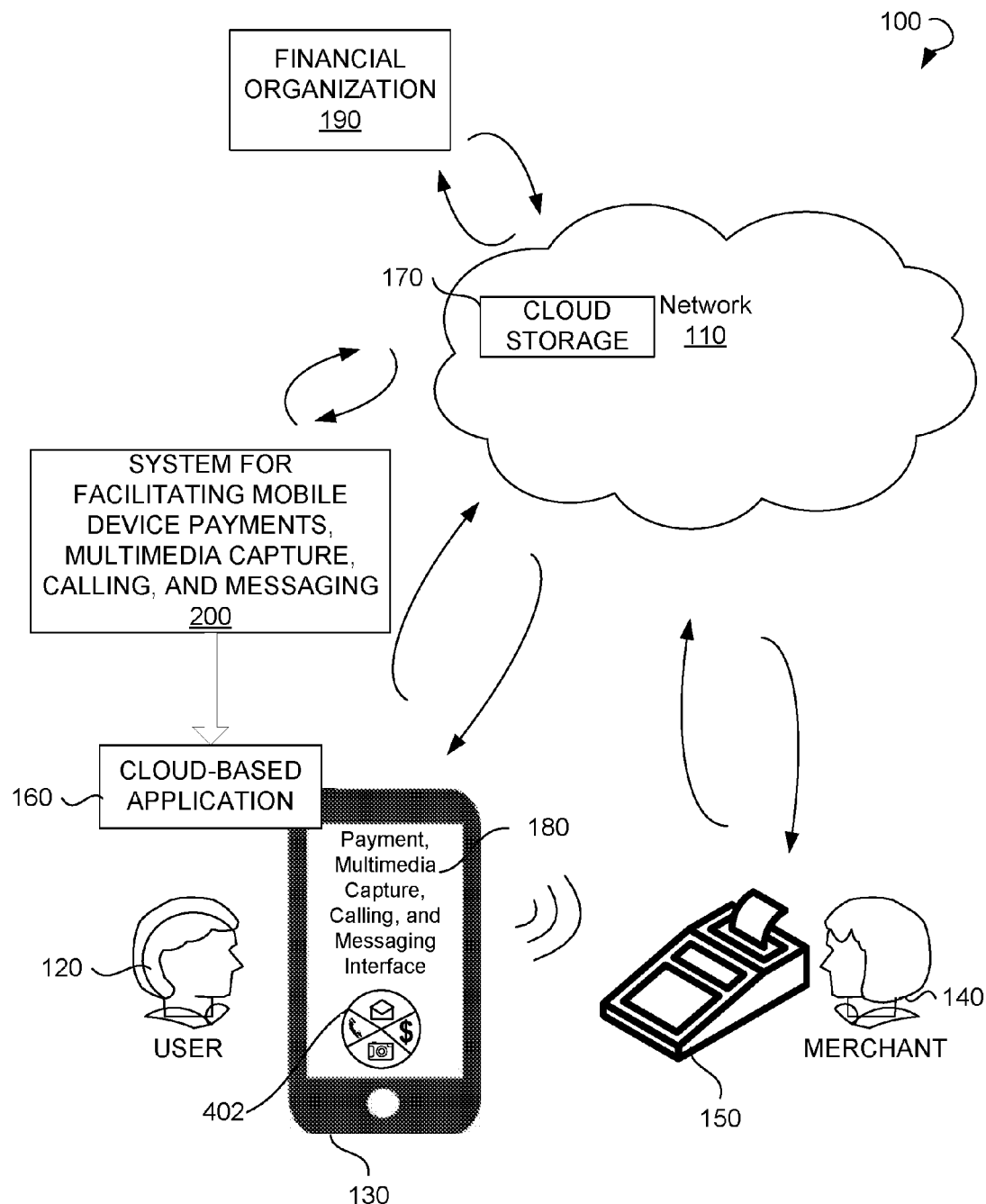
FIG. 1 is a block diagram showing an environment within which methods and systems for facilitating mobile device payments, multimedia capture, calling, and messaging via a mobile and wearable device can be implemented, in accordance with an example embodiment.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Various computer implemented methods and systems for facilitating mobile device payments, multimedia capture, calling, and messaging are described herein. The described system enables a user to select an operation from a list of predetermined operations by varying time of interaction of the user with a display of the mobile and wearable device, such as a smart phone, a smart watch, augmented reality glasses, and the like. More specifically, the user may touch the display for a certain time. Based on the duration of the touching, the operation may be automatically selected from the list of predetermined operations and the selected operation may be initiated. The list of predetermined operations may include a payment operation, a multimedia capture operation, a calling operation, a messaging operation, and any other operation to be performed by the mobile and wearable device.

When the duration of the touch is determined to correspond to the payment operation, the payment operation may be initiated. Upon the initial initiation of the payment operation, the user may be prompted to provide payment details of a payment card of the user. To provide the payment details, the user may capture payment details of the payment card by a camera of the mobile and wearable device, read the payment details from the payment card using a wireless communication, such as an NFC, input the payment details of the payment card manually, download the payment details of the payment card from a cloud storage, and so forth.

When the payment operation is initiated, the user may be prompted to bring the mobile and wearable device into proximity to a payment a merchant device associated with a merchant. The mobile and wearable device and the merchant device may communicate via the NFC. When the NFC is established, the user may be prompt to provide an authentication information, for example, by placing a finger on the display of the mobile and wearable device so that a fingerprint of the user can be scanned. If the scanned fingerprint matches predetermined fingerprints, a one-time code may be generated based on the payment details to encrypt the payment details. The one-time code may be transmitted to the financial organization to perform the payment.

When the duration of the touch is determined to correspond to the multimedia capture operation, the multimedia capture operation may be initiated. Upon initiation of the multimedia capture operation, multimedia may be captured. The duration of the touch may be further analyzed to determine a specific type of the multimedia to be recorded.

For example, the duration of 4 to 6 seconds may correspond to the multimedia capture operation, where the duration of 4 seconds may correspond to an image capture operation, the duration of 4.5 seconds may correspond to a video capture operation, the duration of 5 seconds may correspond to an audio capture operation, and the like. Based on the analysis, the specific type of the multimedia may be recorded to a database.

In an example embodiment, upon the initiation of the multimedia capture operation, the video may be captured. The types of the multimedia may be recorded based on processing of the captured video, such as storing a frame of the video as an image, isolating an audio from the captured video, making an animation by storing several frames as images and cycling the images to be shown one after another, reading a text from frames of the video, e.g., by using an optical character recognition, and so forth. Upon storing of the selected multimedia types to the mobile and wearable device or the cloud storage, the video may be deleted from the mobile and wearable device.

In another example embodiment, upon the initiation of the multimedia capture operation, all predetermined types of the multimedia, such as a text, a photo, a sound, a video, an animation, and the like, may be simultaneously captured. One or more captured multimedia types may be stored based on the analysis of the duration of the touch, and non-selected types of multimedia may be deleted from the mobile and wearable device.

When the duration of the touch is determined to correspond to the calling operation, a calling interface may be displayed to the user. Upon selection of a call recipient by the user from a list of call recipients, the call with the selected call recipient may be initiated.

When the duration of the touch is determined to correspond to the messaging operation, a messaging interface may be displayed to the user. Upon selection of a message recipient and typing of a message by the user, the message may be sent to the selected message recipient.

Referring now to the drawings, FIG. 1 illustrates an environment 100 within which a system and a method for facilitating mobile device payments, multimedia capture, calling, and messaging via a mobile and wearable device can be implemented. The environment 100 may include a network 110, a user 120, a mobile and wearable device 130, a merchant 140, a merchant device 150, and a system 200 for facilitating mobile device payments, multimedia capture, calling, and messaging. The system 200 may have a distributed architecture including a cloud-based application 160, and a cloud storage 170 associated with the mobile and wearable device 130 of the user 120. The mobile and wearable device 130 may include a smartphone, a wearable device (e.g., augmented reality glasses, a smart watch), a tablet computer, a lap top, and so forth.

The merchant device 150 may include a payment terminal, such as a point of sale terminal, a credit card terminal, and any other device that interfaces with payment cards to make electronic funds transfers. The merchant device 150 may be located at a point of sale associated with the merchant 140.

The user 120 may activate the cloud-based application 160 on the mobile and wearable device 130 using the haptic input. Upon activation of the cloud-based application 160, the user 120 may put the mobile and wearable device 130 in a proximity to the merchant device 150 to enable connection between the mobile and wearable device 130 and the merchant device 150. The connection the mobile and wearable device 130 and the merchant device 150 may be established through radio waves, contacts for direct electrical connection, data-strip reading, and so forth. The mobile and wearable device 130 and the merchant device 150 may include one or more of a radio frequency identification chip, an NFC chip, one or more contacts for direct electrical connection, a magnetic data strip, a holographic data strip, and so forth.

Upon establishment of the connection between the mobile and wearable device 130 and the merchant device 150, a payment request may be sent to a financial organization 190 via the network 110.

The cloud-based application 160 may be provided on a display of the mobile and wearable device 130, or may be projected or otherwise displayed by the mobile and wearable device 130 via a web browser or through another way. The cloud-based application 160 may provide to the user 120 a payment, multimedia capture, calling, and messaging interface 180. The cloud-based application 160 may include a file hosting service, which may offer cloud storage, file synchronization, personal cloud, and client software. The cloud-based application 160 may allow users to create a dedicated folder on their client devices, which synchronize with each other so that it appears to be the same folder (with the same contents) regardless of which client device is used to view it. Files placed in the dedicated folder may be also accessible via a website and mobile applications. A freemium business model may be used for access, where users are offered a free account with a set storage size and paid subscriptions for accounts with more capacity. Additionally, the cloud-based application 160 may provide file sharing, collaborating, and other tools for working with files that are uploaded to its servers. Users can determine how their content can be shared with other users, invite others to view and/or edit an account's shared files, upload documents and photos to a shared files folder, and give other users rights to view shared files.

In some embodiments, the cloud-based application 160 includes a media player, multimedia library, online radio broadcaster, and mobile device management application all in one. Thus, the cloud-based application 160 allows users to play, download, and organize digital audio and video as well as other types of multimedia on client devices via computer, internet-connected device, mobile and wearable devices. Additionally, users may send friends and family multimedia content gift cards from client devices. The gift cards can be provided in a range of denominations, and recipients can choose a desired gift, including music membership or another gift from the cloud store. Through the cloud store, users can purchase and download music, music videos, television shows, audio books, podcasts, movies, and movie rentals, and ring-tones via the cloud-based application 160. Further, the cloud-based application 160 may be configured to add to, organize and play digital media collection on the client device, as well as synchronize the digital media collection to a portable device.

The payment, multimedia capture, calling, and messaging interface 180 may include a haptic control and one touch service 402 configured to sense a haptic input of the user 120. The haptic control and the one touch service 402 may include, for example, a one-touch button. The haptic input may include a touch of the user 120 to a specific area of the payment, multimedia capture, calling, and messaging interface 180 associated with the haptic control and the one touch service 402. In response to user interaction with the haptic control and the one touch service 402, the cloud-based application 160 may perform an operation, e.g., a payment operation or a multimedia capture operation. When the payment operation is performed, payment details of the user 120 may be accessed in the cloud storage 170. The payment details may include data of a credit card, debit card, payment card, banking account, virtual currency account, web purse, or another payment facility of the user. The payment details may be encrypted by generating a one-time code to be sent to the financial organization 190. The payment may include an Internet payment, a scan code payment, a person-to-person payment, a buyer-to-merchant payment, a peer-to-peer payment, an in-application payment, a point-of-sale payment, a mobile payment, a wearable payment, a one-touch buying, and a digital wallet payment, and so forth. The payment details are not stored in the mobile and wearable device 130. The payment details may be stored in the cloud storage 170 and provided via the cloud-based application 160 in a form of the one-time code only to perform the payment. Thus, the payment details of the user 120 may be protected from a theft or fraud.

Communication between the mobile and wearable device 130 and the cloud storage 170 may be performed via a network 110. The network 110 may include the Internet or any other network capable of communicating data between devices. Suitable networks may include or interface with any one or more of, for instance, a local intranet, a Personal Area Network, a Local Area Network, a Wide Area Network, a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an IrDA (infrared) port, a Small Computer Systems Interface connection, a Universal Serial Bus connection or other wired or wireless, digital or analog interface or connection, mesh or Digi® networking. The network 110 may be a network of data processing nodes that are interconnected for the purpose of data communication.

The systems and methods describe herein may also be practiced in a wide variety of network environments (represented by the network 110) including, for example, Transmission Control Protocol/Internet Protocol (TCP/IP)-based networks, telecommunications networks, wireless networks, etc. In addition, the computer program instructions may be stored in any type of computer-readable media. The program may be executed according to a variety of computing models including a client/server model, a peer-to-peer model, on a stand-alone computing device, or according to a distributed computing model in which various functionalities described herein may be effected or employed at different locations.

Figure 2:
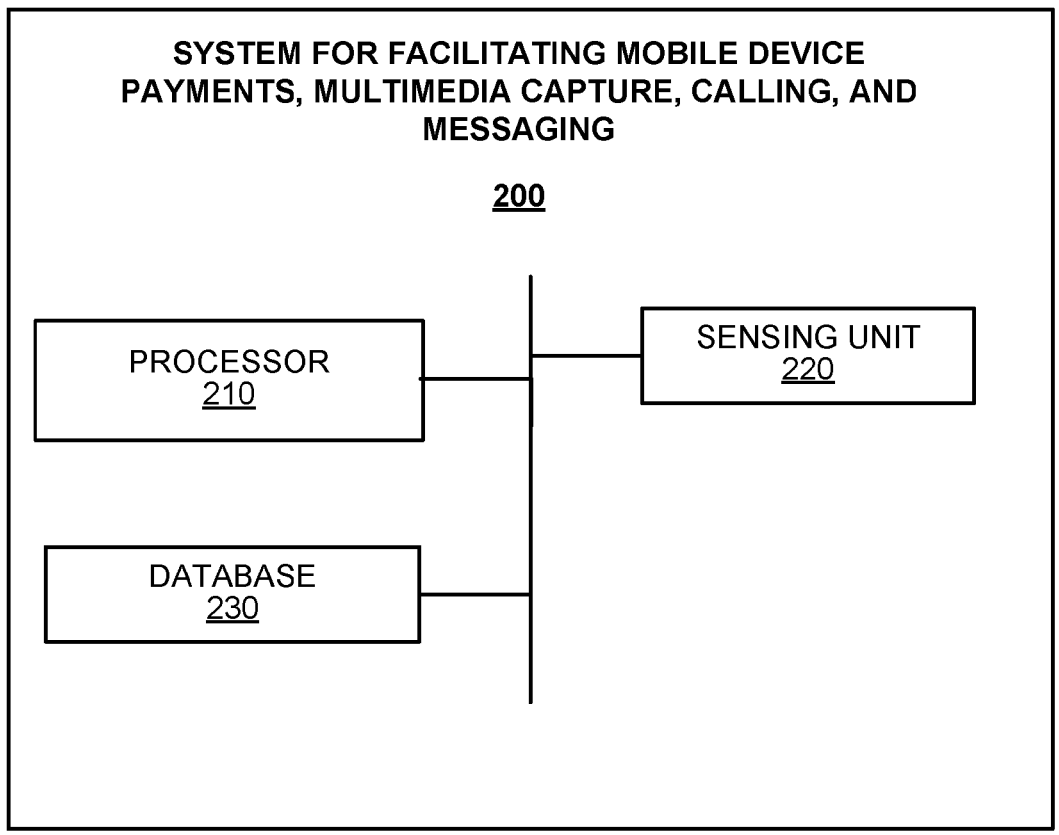
FIG. 2 is a block diagram showing a system for facilitating mobile device payments, multimedia capture, calling, and messaging in accordance with an example embodiment.

FIG. 2 is a block diagram showing various modules of a system 200 for facilitating mobile device payments, multimedia capture, calling, and messaging via a mobile and wearable device, in accordance with certain embodiments. Specifically, the system 200 may include a processor 210, a sensing unit 220, and a database 230. Operations performed by each of the processor 210, the sensing unit 220, and the database 230 are described below with reference to FIG. 3.

Figure 3:
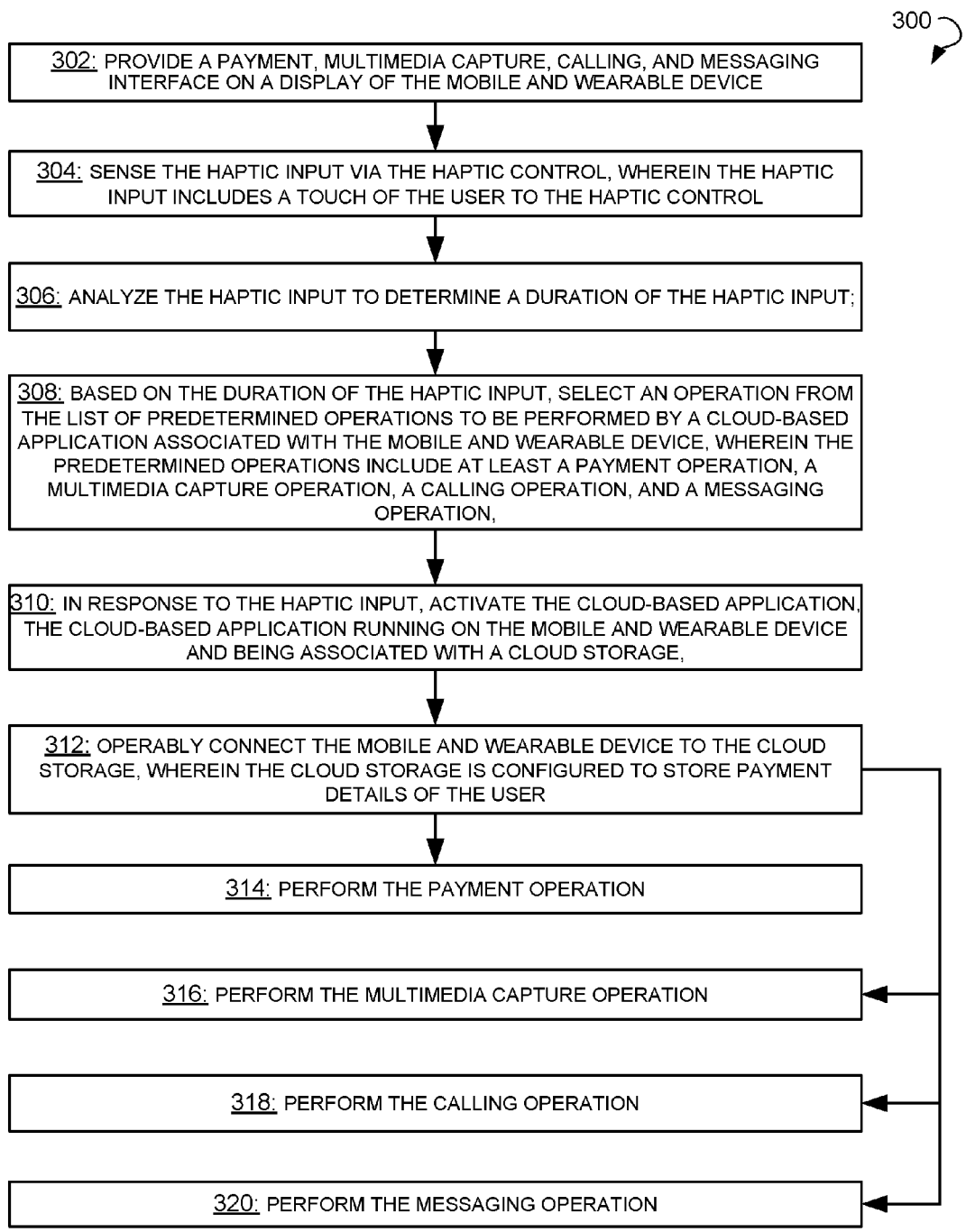
FIG. 3 is a flow chart illustrating a method for facilitating mobile device payments, multimedia capture, calling, and messaging system in accordance with an example embodiment.

FIG. 3 is a flow chart illustrating a method 300 for facilitating mobile device payments, multimedia capture, calling, and messaging via a mobile and wearable device, in accordance with certain embodiments. The method 300 may commence with providing, by a processor, a payment, multimedia capture, calling, and messaging interface on a display of the mobile and wearable device at operation 302. The payment, multimedia capture, calling, and messaging interface may include a haptic control and one touch service to sense a haptic input of a user. The payment, multimedia capture, calling, and messaging interface may be further configured to receive a selection from a list of predetermined operations. The method 300 may include sensing, by a sensing unit, the haptic input via the haptic control and the one touch service at operation 304. The haptic input may include a touch of the user to the haptic control and the one touch service. Furthermore, the method 300 may include analyzing the haptic input to determine a duration of the haptic input at operation 306. The method 300 may continue with selecting, at operation 308, an operation from the list of predetermined operations to be performed by a cloud-based application associated with the mobile and wearable device. The selection may be based on the duration of the haptic input associated with the multimedia capture operation. The predetermined operations may include at least a payment operation, a multimedia capture operation, a calling operation, and a messaging operation. The mobile and wearable device may be operable to perform each of the payment operation, the multimedia capture operation, the calling operation, and the messaging operation. The selecting of the payment operation may be associated with making a payment request by the user. In response to the haptic input, the method 300 may include activating the cloud-based application at operation 310. The cloud-based application may be running on the mobile and wearable device and may be associated with a cloud storage. The cloud-based application may be related to one or more dedicated folders provided on one or more client devices associated with the user. The one or more dedicated folders may synchronize across the one or more client devices, and contents of the one or more dedicated folders being accessible via a web resource and the cloud-based application. The cloud-based application may include a payment, multimedia capture, calling, and messaging application. The payment, multimedia capture, calling, and messaging application may be associated with an application protocol. The application protocol may be integrated into a communication platform associated with the mobile and wearable device.

In some embodiments, the method 300 may include prompting the user to log into the cloud-based application and provide a consent to initiate payments on behalf of the user. Upon the consent, the payments may be initiated automatically without requesting the consent of the user. An access to the cloud-based application may be performed via initiating one or more of the following: an NFC payment, a Wi-Fi payment, a beacon payment, a mobile payment, a digital wallet payment, and the like.

The method 300 may continue with operably connecting the mobile and wearable device to the cloud storage at operation 312. The cloud storage may be configured to store payment details of the user. The payment details may be provided by the user during a first launch of the cloud-based application on the mobile and wearable device. In an example embodiment, the payment details may include data related to one or more of the following: a banking account associated with the user, credit card associated with the user, a debit card associated with the user, a gift card associated with the user, a prepaid card associated with the user, an insurance account associated with the user, mobile currency associated with the user, and a virtual money account of the user, and so forth. The payment details of the user may be linked to a mobile and wearable device number.

In response to the payment operation being selected, the method 300 continues with operation 314, at which the payment operation may be performed. More specifically, the method 300 may include receiving the payment details associated with the user from the cloud storage. The payment details may be used to perform a payment via the mobile and wearable device based on the payment request. In an example embodiment, the payment may include an internet payment, an NFC payment, a scan code payment, a person-to-person payment, a buyer-to-merchant payment, a peer-to-peer payment, an in-application payment, a point-of-sale payment, a mobile payment, a wearable payment, a digital wallet payment, and so forth.

In an example embodiment, the payment may be associated with a joint account of the user. The joint account may include an account associated with banks and retailers, such as an account opened by the user in a bank or in an organization associated with a retailer. The retailers may include one or more of the following organizations: Wal-Mart, Costco, The Kroger Company, Home Depot, Walgreens Boots Alliance Inc, Target, ETC, and so forth. The banks may include one or more of the following: Fargo bank, Citibank bank, Industrial and Commercial Bank of China, China Construction Bank, Agricultural Bank of China, Bank of China, Mitsubishi UFJ, HSBC Holdings, JPMorgan Chase, BNP Paribas, Bank of America, Credit Agricole, and so forth. More specifically, the joint account may be associated with providing cash rewards for net purchases. The cash rewards may remain unexpired until the joint account remains open. The joint account may be further associated with providing a zero percent annual percentage rate for purchases and balance transfers, providing cash rewards for mobile wallet net purchases after opening of the joint account, providing cash back redemption options at automated teller machines, providing deposits into a mobile account and a savings account, an providing protection of the joint account. In particular, the protection may include fraud monitoring, sending alerts, zero liability protection, and so forth. The joint account may be further associated with providing a zero annual fee and providing bonuses for the purchases. The bonuses may include a predetermined number of flying miles associated with one or more airlines, booking rooms in hotels, and so forth. The flying miles and the bookings may remain unexpired until the client uses the flying miles and the bookings and may not need any international transaction fees in case to flying to different counties or staying at hotel in different countries.

Furthermore, the method 300 may include receiving an indication that the user brings the mobile and wearable device in proximity to a merchant device associated with a merchant to make the payment to the merchant. The indication may be received based on sensing an interaction of the mobile and wearable device with the merchant device. The interaction may include at least an NFC. The NFC may be used to pair the mobile and wearable device and the merchant device upon bringing the mobile and wearable device into proximity to the merchant device. The mobile and wearable device and the merchant device may be connected to a cloud network. Upon pairing the mobile and wearable device with the merchant device, at least a Bluetooth connection between the mobile and wearable device and the merchant device may be established. The payment details and authorizing data associated with the user may be stored in the cloud storage associated with the cloud network. The method 300 may continue with receiving product data and merchant data. The product data and the merchant data may be provided by the merchant device based on the interaction. The product data may include at least a price of a product associated with the payment. The method 300 may include prompting the user to provide an authentication information. The prompting may include at least displaying an authentication button on the display of the mobile and wearable device. Furthermore, the method 300 may include authenticating an identity of the user. The authentication may include at least a biometric authentication. The biometric authentication may include one or more of a fingerprint authentication, an iris pattern authentication, a heartbeat authentication, and a vein pattern identification. The vein pattern identification may be performed using scanning of one or more of the following: a palm vein pattern, a wrist vein pattern, a hand vein pattern, a leg vein pattern, a foot vein pattern, a neck vein pattern, and a head vein pattern. The fingerprint authentication may include scanning fingerprints of at least one finger of the user when the user touches one or more or the following: the display of the mobile and wearable device, a button of the mobile and wearable device, a rear panel of the mobile and wearable device, and the like. The fingerprint authentication may further include matching the fingerprints to one or more approved fingerprints. The one or more approved fingerprints may be stored in the cloud storage. The method 300 may continue with encrypting, upon the matching, the payment request associated with the payment operation to obtain an encrypted payment request. The encrypting of the payment request may include generating a one-time code. The one-time code may encode at least the payment details of the user, the product data, and the merchant data. Furthermore, the method 300 may include transmitting the encrypted payment request to a financial organization. The method 300 may continue with receiving, from the financial organization, a confirmation of the payment from the user to the merchant performed by the financial organization. The method 300 may include storing information associated with the payment to a database of the mobile and wearable device associated with the user. The payment operation may be authorized in part when a geographic location determined by the mobile and wearable device matches a geographic location of the merchant at a time of the selecting of the payment operation.

In response to the multimedia capture operation being selected, operation 316 may be initiated, at which the multimedia capture operation may be performed. More specifically, the method 300 may include capturing multimedia by one or more sensors of the mobile and wearable device to obtain captured multimedia. The captured multimedia may be stored to the database the mobile and wearable device. The multimedia may include one of more of the following: a text, a photo, a sound, a video, an animation, a geographic location, and an object being captured by grabbing screenshots of the mobile and wearable device. The screenshots including links may include one or more of the following: a Shop Now link, a Book Now link, a Download link, a Learn More link, a Buy Now link, a Pay Now link, and a Sign Up link. The method 300 may continue with selecting one or more multimedia types for recording from the captured multimedia based on predetermined rules associated with a predetermined time of the providing the haptic control and the one touch service by the user. The selection may be based on the duration of the haptic input associated with the multimedia capture operation. The method 300 may include storing the one or more multimedia types into the database of the mobile and wearable device and the cloud storage.

In response to the calling operation being selected, operation 318 may be initiated, at which the calling operation may be performed. More specifically, the method 300 may include providing a calling interface on the display of the mobile and wearable device, to enable the user to provide, via the calling interface, a call recipient. Upon receipt of the call recipient, the method 300 may continue with performing a call with the call recipient via a data network.

In response to the messaging operation being selected, operation 320 may be initiated, at which the messaging operation may be performed. More specifically, the method 300 may include providing a messaging interface on the display of the mobile and wearable device to enable the user to provide, via the messaging interface, a message and a selection of a message recipient. Upon receipt of the message and the selection of the message recipient, the method 300 may continue with sending the message to the message recipient via the data network.

In an example embodiment, the method 300 may further include receiving, from the user, a registration request to register the user in a mobile payment service associated with the cloud-based application. The user may send the registration request via the cloud-based application associated with the mobile and wearable device. The registration request may be provided by positioning at least one payment card in proximity to a camera of the mobile and wearable device, capturing, by the camera of the mobile and wearable device, the payment details associated with the at least one payment card associated with the user, and parsing the captured payment details. The payment card may be selected from one or more of the following: a smart card, a proximity card, an integrated circuit card, a magnetic strip card, a Europay, MasterCard, and Visa (EMV) smart payment card, the electronic payment card storing card data of one or more of debit cards, credit cards, gift cards, loyalty cards, prepaid cards, bank cards, identity cards, membership cards, and the like. In a further example embodiment, a service provider associated with the mobile payment service and the cloud-based application may provide the user with a compensation for future purchases made via the cloud-based application. The compensation may be equal to an amount of the payment or any predetermined amount.

In further example embodiments, the method 300 may include securing the mobile and wearable device via a band to a part of a human body. The part of the human body may include one or more of the following: a wrist, an arm, a neck, a bead, a leg, a waist, an ear, and a finger. The mobile and wearable device may be secured under, within or on clothing.

In some example embodiments, the cloud-based application may include one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize the multimedia with a portable device and one or more internet-connected devices. The cloud-based application may be configured to prompt the user to purchase and download one or more or the following: music, music videos, television shows, audio books, movies, movie rentals, and the like.

In further example embodiments, the cloud-based application may reside in the cloud network and may be provided on the mobile and wearable device via a web browser, a projector, or a hologram. The cloud-based application may be provided for purchase in one or more applications stores. The one or more applications stores may be associated with an operating system including one of the following: Microsoft Windows, Linux, Android, Blackberry, iOS, Windows Phone, and so forth. In some example embodiments, the cloud-based application may be provided free of charge or at a predetermined price.

In an example embodiment, the cloud-based application may include at least a physical card emulation (PCE) client. The PCE client may be configured to provide emulation of a physical card to combine physical payment cards with cloud computing and provide an emulated payment card. The physical payment card may be emulated based on metadata associated with the user, a phone number associated with the user, and data associated with a point of sale (POS) terminal of the merchant. The PCE client may be further configured to provide a virtual representation of emulated payment card. The operating system associated with the mobile and wearable device may be configured to run the PCE client, and provide two communication paths for NFC commands from the POS terminal based on an application identifier (AID) associated with the PCE client. The operating system may be further configured to use the AID to route the NFC commands to the cloud-based application managing the emulation of the physical card. When the user presents the emulated payment card for transaction, an NFC command may be routed to the PCE client for verification and authorization using though the cloud-based application. The cloud-based application may be configured to connect to a backend associated with an issuer of the physical payment card to complete the transaction. The cloud-based application may be associated with a trusted tokenization node. The trusted tokenization node may include a shared resource used to generate and de-tokenize tokens representing data associated with the physical payment card at the backend associated with the issuer. The PCE client may provide multi-level security by providing limited use keys, tokenization, device fingerprinting, and dynamic risk analysis. The limited use keys may be derived from a master domain key shared by the issuer. Using of the limited use keys may be associated with time to live of the limited use keys and a number of transactions to be performed using the limited use keys. The device fingerprints may include profiles accosted with the mobile and wearable device and may be used to determine that transactions are initiated only by an authorized mobile and wearable device at recognized locations of the POS terminal.

In an example embodiment, the one touch service may be integrated with import and export service for international trade and trade assurance (ITTA) services. The one touch service may further help with customs clearance preparation and assist in foreign exchange collections with just a tag and one touch payment on a computer screen. Furthermore, the one touch service may be integrated into an online platform providing professional import and export business process outsourcing (IEBPO) services to cross border trade enterprises, and bring business process operations online and set up credit system for the trade enterprises with only one touch payment. More specifically, the one touch service may consolidate scattered service resources of different sorts for cross border trade partners and provide professional services including customs clearance, logistics, trade insurance, financing services and freight forwarding services. The one touch service may be integrated with e-commerce company providing consumer-to-consumer, business-to-consumer and business-to-business sales services via web portals. The one touch service may further be integrated with electronic payment services, a shopping search engine and data-centric cloud computing services. More specifically, the one touch service may be integrated with a third-party online payment platform without charge, but earn interests on deposit and short time payment cash deposit. The one touch service may provide a third-party online escrow (TPOE) service, in which buyers can verify whether they are happy with goods they have bought before releasing payment to the seller. The one touch service company may further operate worldwide online payments system that supports online money transfers and serves as an electronic alternative to traditional paper methods like checks and money orders. More specifically, one touch service company may operate as a payment processor for online vendors, auction sites and other commercial users, for which it charges a fee. The one touch service company may provide a microcredit, i.e. very small loans (microloans), to impoverished borrowers who typically lack collateral, steady employment and a verifiable credit history, which is designed not only to support entrepreneurship and alleviate poverty, but also in many cases to empower women and uplift entire communities by extension. The one touch service may further be integrated with the third-party online payment platform, which provides an escrow service, in which consumers can verify whether they are happy with goods they have bought before releasing money to the seller, which provides the safest way to transact online, where the funds are held in trust, no chargebacks or reversals.

In some example embodiments, the cloud storage may be further configured to receive an access request and provide access to the multimedia and provide an access to downloading, uploading, buying, and paying for the multimedia. Additionally, the cloud storage may be further configured to store the multimedia, a record of an access made to the multimedia, and content use terms and rules for controlling the access to the multimedia. Furthermore, the cloud storage may be further configured to provide payment validation data to the mobile and wearable device and one or more internet-connected devices. The access may be performed via a Wi-Fi network, 3G network, 4G network, 5G network, or 6G network.

In further example embodiments, the method 300 may include capturing, by a camera of the mobile and wearable device, one or more product codes associated with one or more products. The one or more product codes may include at least a product data associated with the one or more products and a list of the one or more products. The product data may be encoded into the one-time code transmitted to the financial organization. The one or more product codes may be selected from the following: a barcode, a linear dimensional code, a two-dimensional code, a snap tag code, a QR code, and so forth.

The method 300 may include receiving merchant data based on the one or more product codes. Wherein the merchant data may be used to determine a loyalty program data of the user. The loyalty program data may be associated with a loyalty program of the merchant. The loyalty program data may be encoded into the one-time code transmitted to the financial organization. Based on the loyalty program data, the user may be provided with a discount, a cashback, a free product, and the like.

Figure 4:
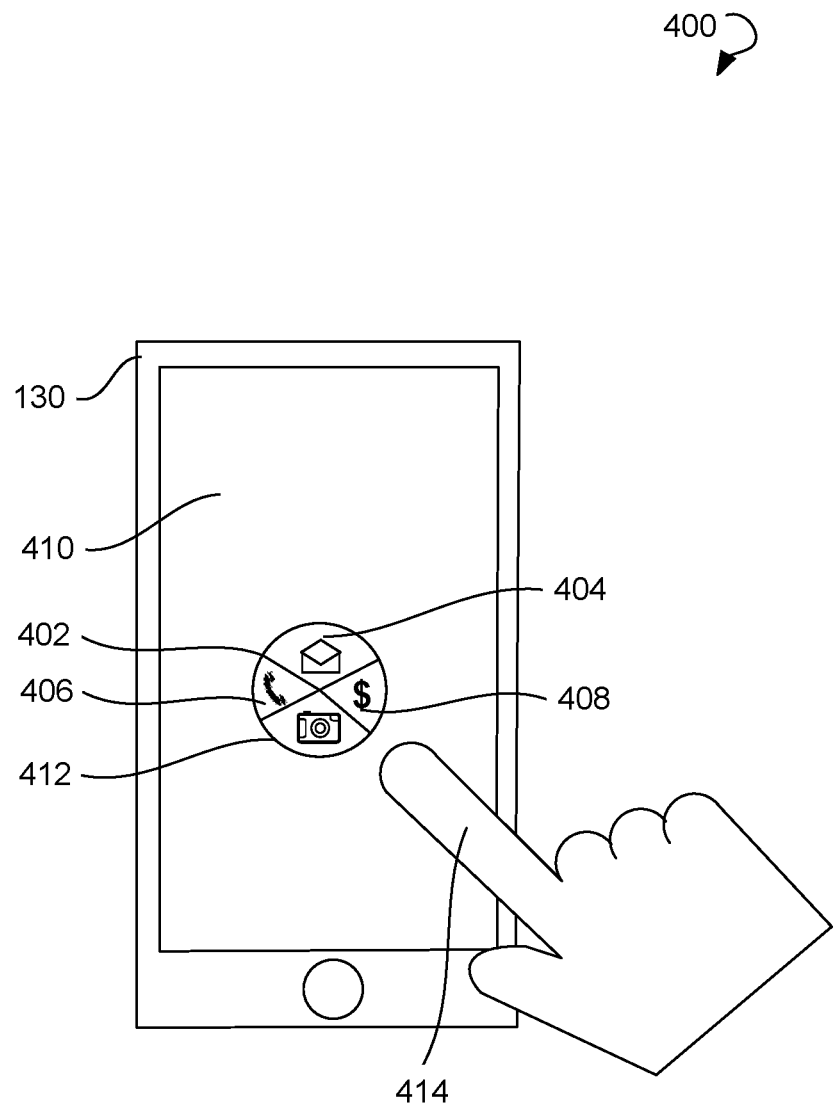
FIG. 4 is a block diagram illustrating a haptic control and one touch service, in accordance with an example embodiment.

FIG. 4 is a diagram 400 illustrating a haptic control and one touch service, in accordance with certain embodiments. The haptic control and the one touch service 402 may be shown on a display 410 of a mobile and wearable device 130. The haptic control and the one touch service 402 may include one or more mode selection elements. The mode selection elements may include a messaging mode 404, a calling mode 406, a payment mode 408, and a multimedia capture mode 412. A user may give a haptic command (e.g., touch by a user finger 414) to select a desired mode.

In an example embodiment, the haptic control and the one touch service may be integrated with at least one mobile application associated with the mobile and wearable device. The at least one mobile application may be integrated into a software development kit and an operating system of the mobile and wearable device. Upon launching of the at least one mobile application by the user, the user may be prompted to log in and asked to provide a consent that the at least one mobile application initiates future payments on behalf of the user. During further purchases, the at least one mobile application may be launched by default without a need for a further action from the user to initiate launching of the at least one mobile application. The further action may include entering a login and a password by the user. The at least one mobile application may be associated with performing payments and buying products or services in the Internet.

Transactions can be associated with transactional payments based on Unstructured Supplementary Service Data or Short Message Service, direct operator billing, credit card mobile payments, online wallets, QR code payments, contactless NFC, cloud-based mobile payments, audio signal-based payment, Bluetooth Low Energy signal beacon payment, in-application payment, Software Development Kit payment, Application Programmable Interface payment, social networking payment, and direct carrier/bank co-operation.

When the user selects the payment mode 408, a transaction request may be generated. In an example embodiment, the transaction request may be generated using data of a mobile application or a page from which the payment mode is activated. For example, the user may activate the payment mode from a purchase page of an online store. The payment may be immediately initiated without requesting further details. Data of a payment recipient and a payment amount may be received from the actual page or application and financial information of the user may be stored in the database of the mobile payment service. The user financial information may be provided by the user during registration with a mobile payment service associated with the mobile and wearable device 130 and may include one or more of the following: bank account information, credit card information, debit card information, gift card information, prepaid card information, insurance account information, merchant account information, mobile currency information, digital money, and so forth. Online payments can be secured by two-factor authorization. One of the factors may be authorization on the integrated interface initiation, and the other factor may include locating the mobile and wearable device associated with the user and comparing the location with the location where the payment is requested.

Alternatively, the payment request may be generated using data of a page associated with billing. In that case, the mobile payment service may generate a payment request using information extracted from the page as well as the financial information of the user stored in the mobile payment service.

Alternatively, when being at a point of sale, the user may scan codes, such as barcodes, of products the user wants to buy. The barcodes may include linear barcode, a two-dimensional barcode, a three-dimensional barcode, a machine readable code, and so forth. Upon interaction of the mobile and wearable device 130 with a merchant device, the payment request may be generated based on the scanned codes. More specifically, the NFC may be used to receive data for the payment request. For example, when the payment mode is selected, the user may make a payment for purchases in physical stores or transportation services. The mobile and wearable device 130 may be equipped with a smart card. When the user waves the mobile and wearable device 130 near the merchant device (e.g., a radar module), a payment may be made. In some cases, the payment may require authentication. The amount of the payment may be deducted from a pre-paid account or changed to a mobile account or a bank account directly.

The audio channel of the mobile and wearable device may be another wireless interface that may be used to receive data for the payment request. Ultra sound and acoustic features of the mobile and wearable device may support mobile payments. Near sound data transfer, data over voice and the NFC may produce audio signatures that the mobile and wearable device can pick up to enable electronic transactions.

Figure 5:
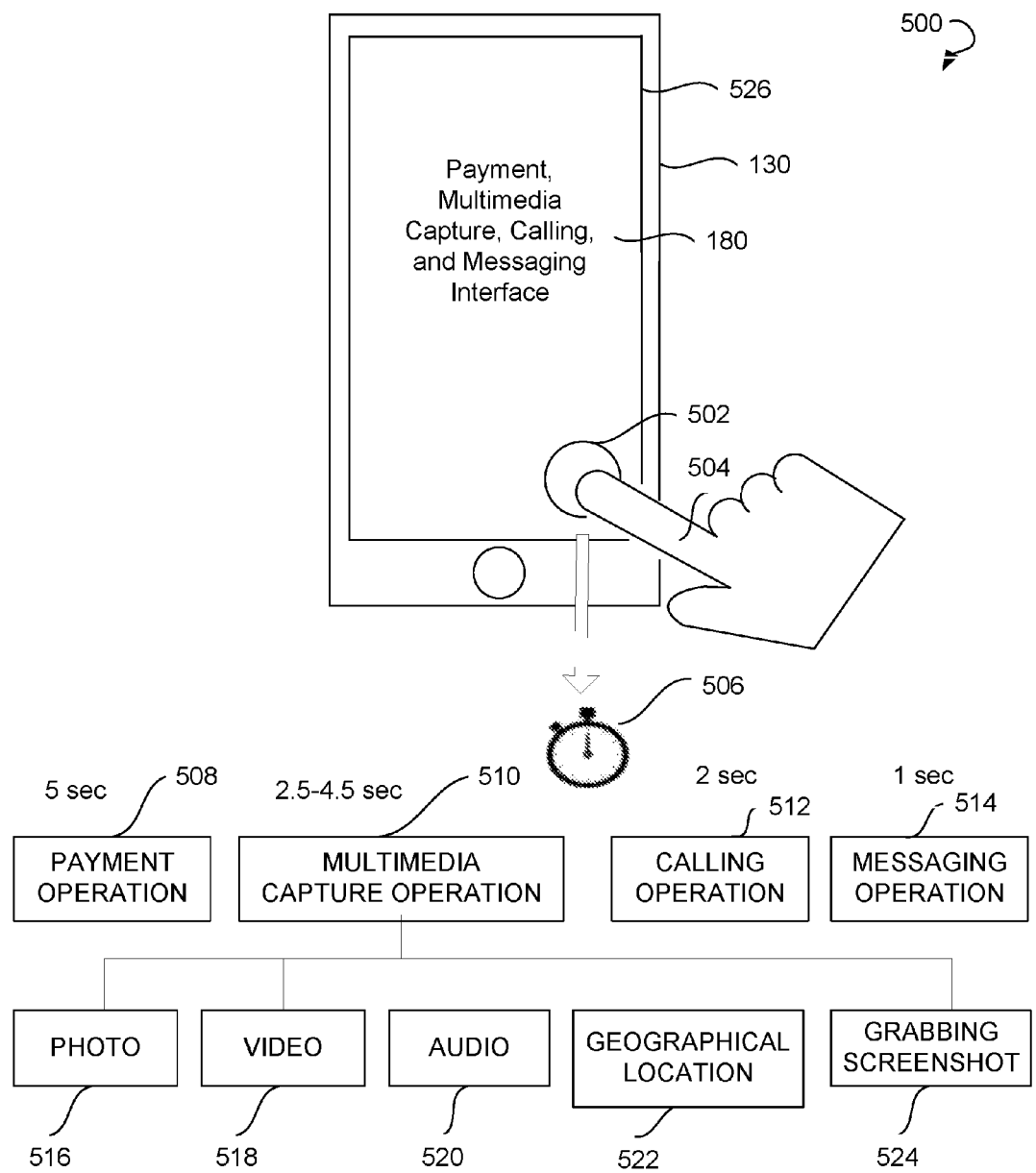
FIG. 5 is a block diagram illustrating a haptic input via a haptic control and one touch service, in accordance with an example embodiment.

FIG. 5 is a block diagram 500 illustrating a haptic input via a haptic control and a one touch service, in accordance with certain embodiments. The haptic control and the one touch service 502 may be provided with a payment, multimedia capture, calling, and messaging interface 180 shown on a display 526 of a mobile and wearable device 130. A user may give a haptic command by touching the haptic control and the one touch service 502 with his finger 504. A duration 506 of the haptic input may be determined. Based on the duration 506, an operation to be performed may be selected from a payment operation 508, a multimedia capture operation 510, a calling operation 512, and a messaging operation 514. For example, if the duration 506 is one second, the messaging operation 514 may be initiated. If the duration 506 is two seconds, the calling operation 512 may be initiated. If the duration 506 is five seconds, the payment operation 508 may be selected and performed. If the duration is from two and a half seconds to four and a half seconds, the multimedia capture operation 510 may be selected and performed. Specific durations of the time interval of m two and a half seconds to four and a half seconds may correspond to capturing specific multimedia types. For example, the duration 506 of 2.5 seconds may correspond to a photo capturing operation 516, the duration 506 of 3 seconds may correspond to a video capturing operation 518, the duration 506 of 3.5 seconds may correspond to an audio capturing operation 520, the duration 506 of 4 seconds may correspond to a geographic location capturing operation 522, the duration 506 of 4.5 seconds may correspond to a screenshot grabbing operation 524 when a current state of the display 526 may be captured, and the like.

Figure 6:
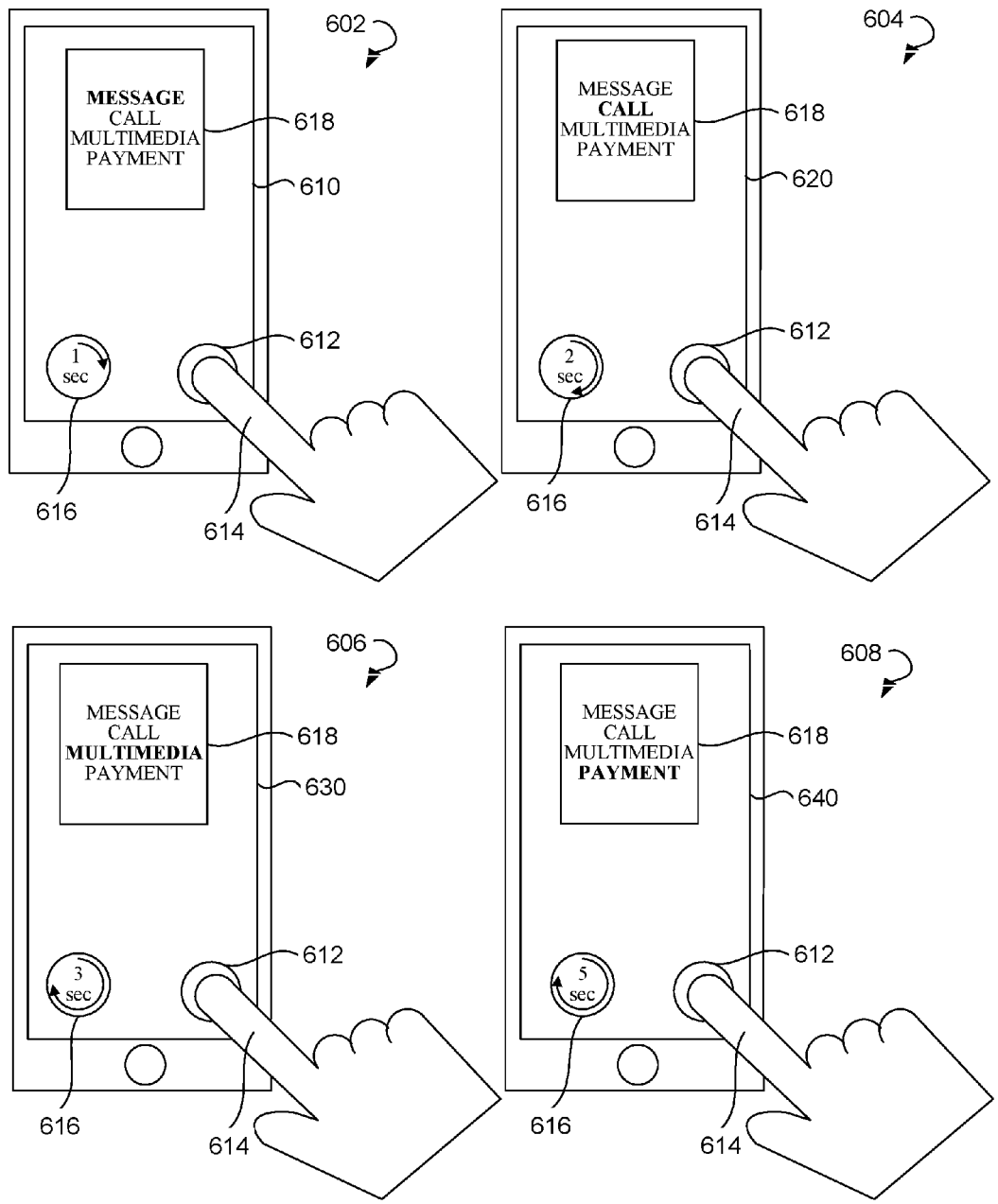
FIG. 6 is a schematic representation of interfaces for selection of a messaging mode, a calling mode, a multimedia capture mode, and a payment mode, in accordance with an example embodiment.

FIG. 6 is a schematic representation of interfaces 602, 604, 606, and 608 for selection of a messaging mode, a calling mode, a multimedia capture mode, and a payment mode, according to an example embodiment. A user may touch a mode selection icon being a haptic control and a one touch service 612 with a user finger 614 on a display 610. A timer 616 may show touch contact time of the user finger 614 with the display 610. A menu 618 representing all available modes may be displayed on the display 610. The modes may include a messaging mode, a calling mode, a multimedia capture mode, and a payment mode.

The multimedia capture mode may include several submodes, such as a video capture mode, an audio capture mode, an image capture mode, a text capture mode, an animation capture mode, and so forth. Each submode of the multimedia capture mode, as well as the payment mode, the calling mode, and the messaging mode may correspond to a predetermined touch contact time. In an example embodiment, the multimedia capture mode may correspond, for example, to the touch contact time of 2.5 to 4.5 seconds. For example, the video capture mode may correspond to the touch contact time of 3 seconds. Therefore, after the user touches the haptic control and the one touch service 612 for 1 second and then stops touching the haptic control and the one touch service 612, the video capture mode may be initiated. Similarly, the audio capture mode may correspond, for example, to the touch contact time of 3.5 seconds. The image capture mode may correspond, for example, to the touch contact time of 2.5 seconds. Similarly, the text capture mode may correspond, for example, to the touch contact time of 2.7 seconds. The animation capture mode may correspond, for example, to the touch contact time of 3.7 seconds.

Similarly, the payment mode may correspond, for example, to the touch contact time of 5 seconds, as shown on the interface 608. Therefore, after the user touches the haptic control and the one touch service 612 for 5 seconds and then stops touching the haptic control and the one touch service 612, the payment mode may be initiated.

Similarly, the messaging mode may correspond, for example, to the touch contact time of 1 second, as shown on the interface 602. Therefore, after the user touches the haptic control and the one touch service 612 for 1 second and then stops touching the haptic control and the one touch service 612, the messaging mode may be initiated.

Similarly, the calling mode may correspond, for example, to the touch contact time of 2 seconds, as shown on the interface 604. Therefore, after the user touches the haptic control and the one touch service 612 for 1 seconds and then stops touching the haptic control and the one touch service 612, the calling mode may be initiated.

Figure 7:
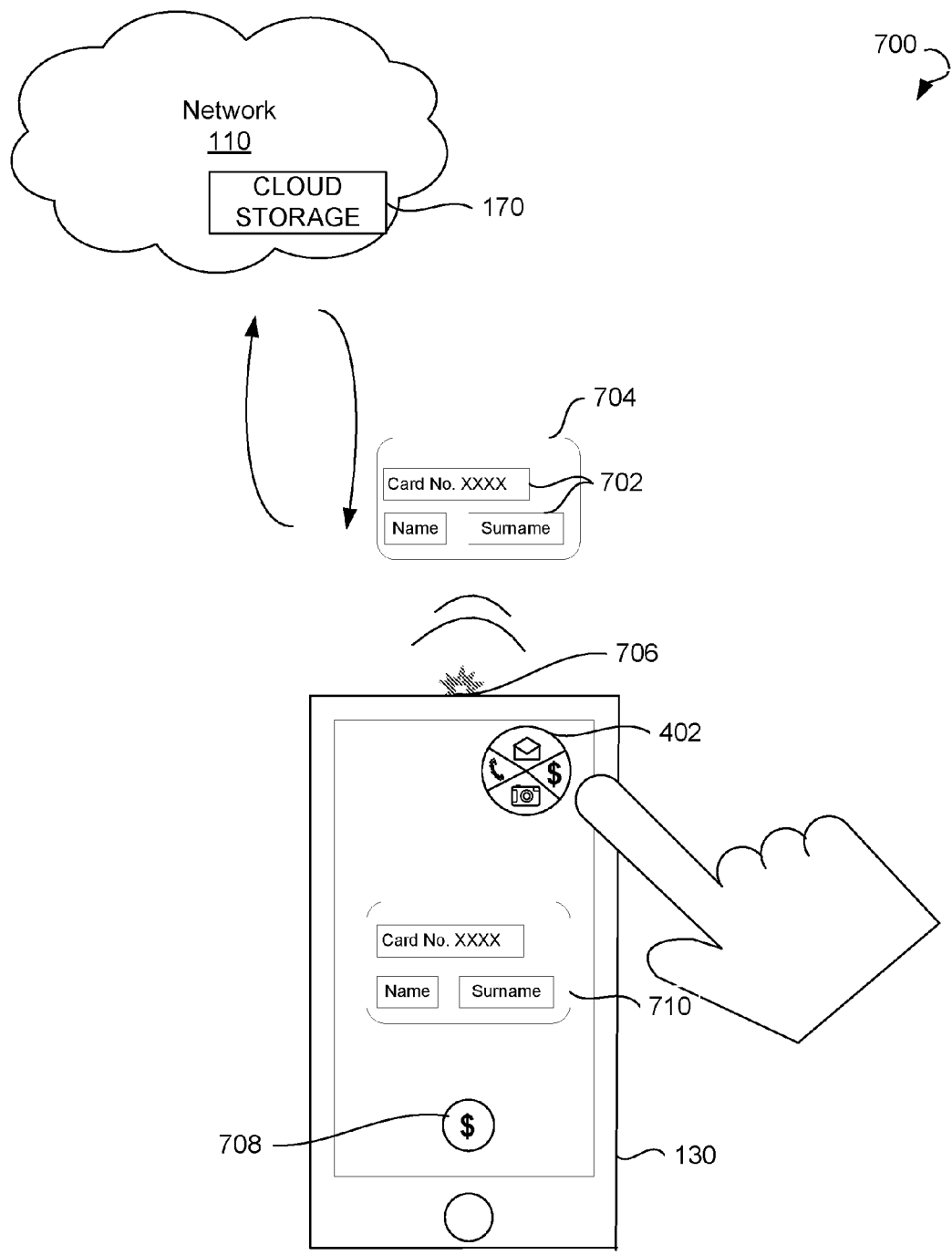
FIG. 7 illustrates a schematic diagram of providing payment details by a user, in accordance with an example embodiment.

FIG. 7 is a schematic representation 700 of providing payment details by a user, in accordance with an example embodiment. In an example embodiment, the payment details 702 may be associated with a payment card 704 of the user. The user may capture an image of the payment card 704 using a camera 706 of the mobile and wearable device 130 upon a first initiation of the payment operation by touching a haptic control and one touch service 402 for a predetermined time. Upon activation of the payment operation, an icon 708 associated with the payment operation may be displayed. Upon capturing the image of the payment card 704, the payment details 702 may be recognized and displayed as an image 710 on the mobile and wearable device 130. The payment details 702 may be transmitted to a cloud storage 170 in a network 110. Upon the transmission, the payment details 702 may be deleted from the mobile and wearable device 130.

In an example embodiment, the payment details 702 may be sensed by the NFC when both the mobile and wearable device 130 and the payment card 704 have an NFC chip.

Figure 8:
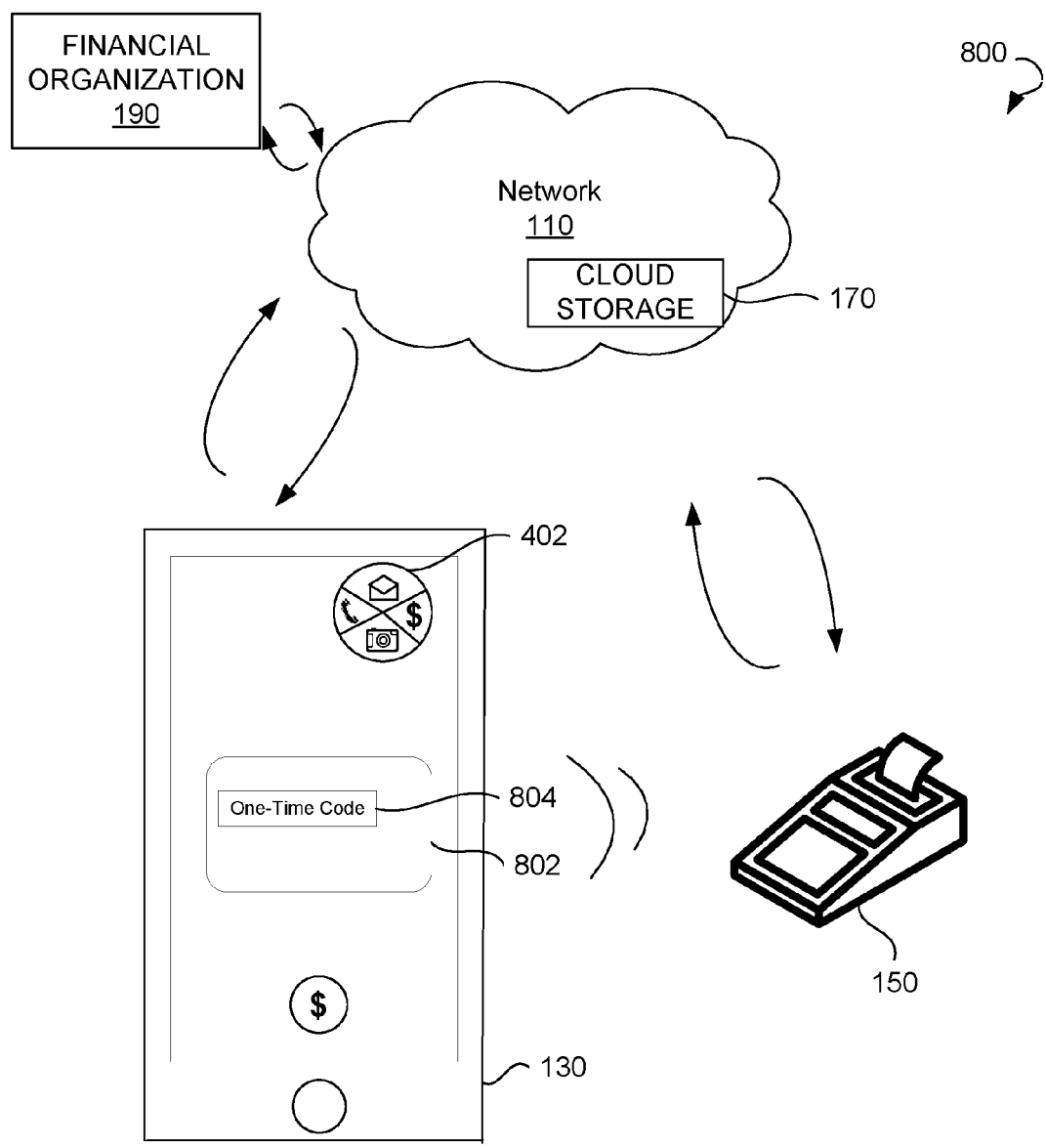
FIG. 8 illustrates a schematic diagram of an interaction of a mobile and wearable device and a merchant device during a payment operation, in accordance with an example embodiment.

FIG. 8 is a schematic representation 800 of an interaction of a mobile and wearable device and a merchant device during a payment operation, in accordance with an example embodiment. In an example embodiment, a user initiates the payment operation by touching a haptic control and one touch service 402 for a predetermined time. The user further brings the mobile and wearable device 130 in proximity to the merchant device 150 so that the mobile and wearable device 130 and the merchant device 150 may communicate with the NFC. When the interaction is determined by a cloud-based application of the mobile and wearable device 130, the cloud-based application may access a cloud storage 170 and generate a one-time code 804 and. The one-time code 804 may include encrypted payment details of a payment card of the user. The one-time code 804 may be delivered to the mobile and wearable device 130 and displayed on the mobile and wearable device 130 on an image of an electronic payment card 802. Alternatively, the cloud-based application may receive merchant details and product details during the NFC interaction. The cloud-based application may encode the encrypted payment details, merchant details, and product details into the one-time code 804 and may send the one-time code 804 to a financial organization 190. Alternatively, the merchant may receive the one-time code 804 from the mobile and wearable device 130 during the NFC interaction and may send the one-time code 804, the merchant details (such as merchant account number), and the product details (such as a total price) to the financial organization 190.

Figure 9:
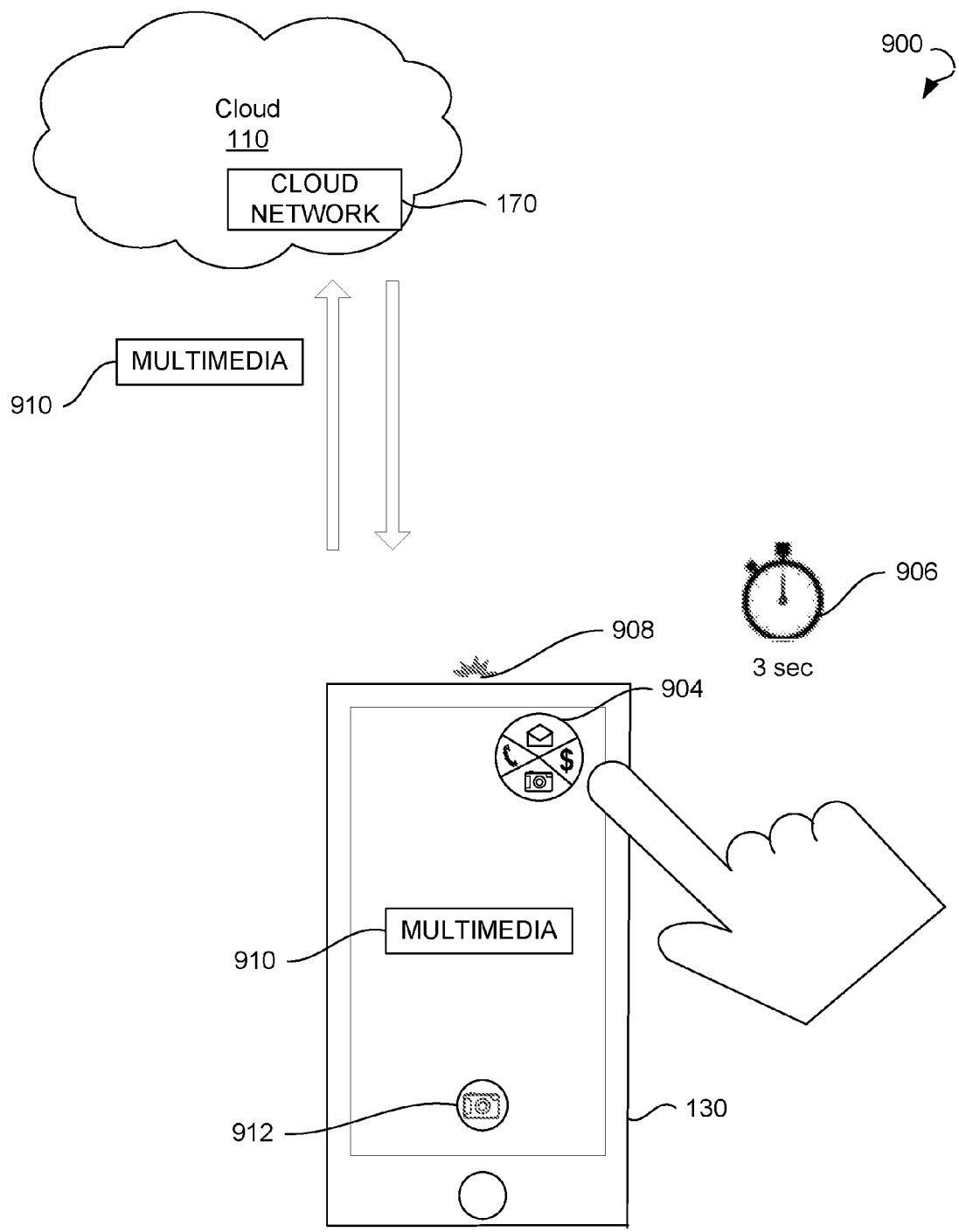
FIG. 9 is a block diagram illustrating a multimedia capturing operation using a system for facilitating mobile device payments, multimedia capture, calling, and messaging via a mobile and wearable device, in accordance with an example embodiment.

FIG. 9 is a block diagram 900 illustrating a multimedia capturing operation using a system for facilitating mobile device payments, multimedia capture, calling, and messaging via a mobile and wearable device, in accordance with certain embodiments. The haptic input of the user via the haptic control and the one touch service 904 may be interpreted as a request to perform the multimedia capture operation according to the duration 906 of the input. In an example embodiment, an icon 912 corresponding to the multimedia capture operation may be displayed to show the current operation to the user. A camera 908 and any other sensors of the mobile and wearable device 130 may be activated and multimedia 902 may be captured. The captured multimedia 910 may be transmitted and stored to the cloud storage 170 in the network 110. The captured multimedia 910 may be further stored in a database of the mobile and wearable device 130.

Figure 10:
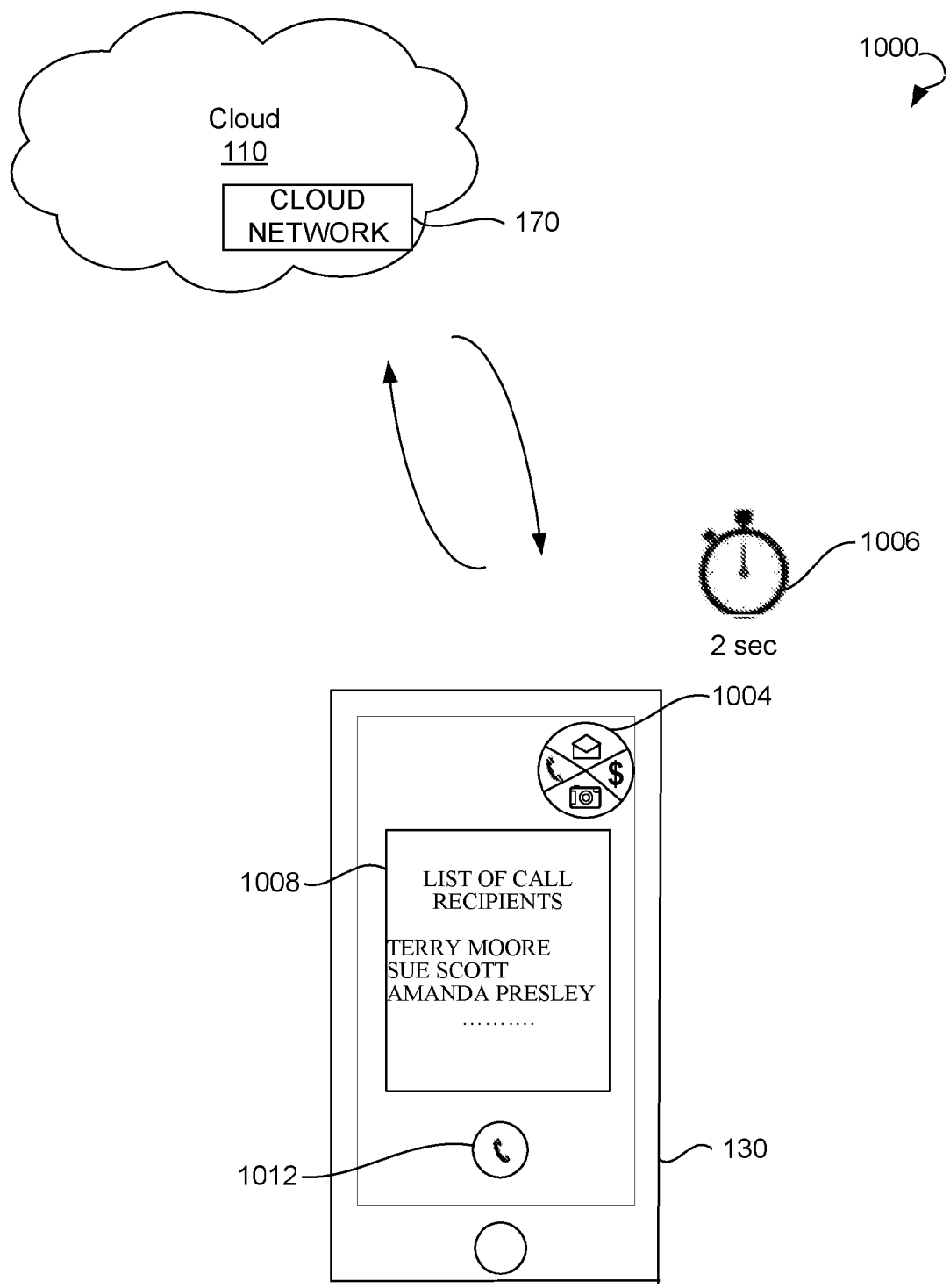
FIG. 10 is a block diagram illustrating a calling operation using a system for facilitating mobile device payments, multimedia capture, calling, and messaging via a mobile and wearable device, in accordance with an example embodiment.

FIG. 10 is a block diagram 1000 illustrating a calling operation using a system for facilitating mobile device payments, multimedia capture, calling, and messaging via a mobile and wearable device, in accordance with certain embodiments. The haptic input of the user via the haptic control and the one touch service 1004 may be interpreted as a request to perform the call operation according to the duration 1006 of the input. In an example embodiment, an icon 1012 corresponding to the calling operation may be displayed to show the current operation to the user. Upon initiation of the calling operation, a list 1008 of call recipients may be displayed. The user may select one of the call recipients from the list 1008. Upon the selection, the call to the selected call recipient may be initiated.

Figure 11:
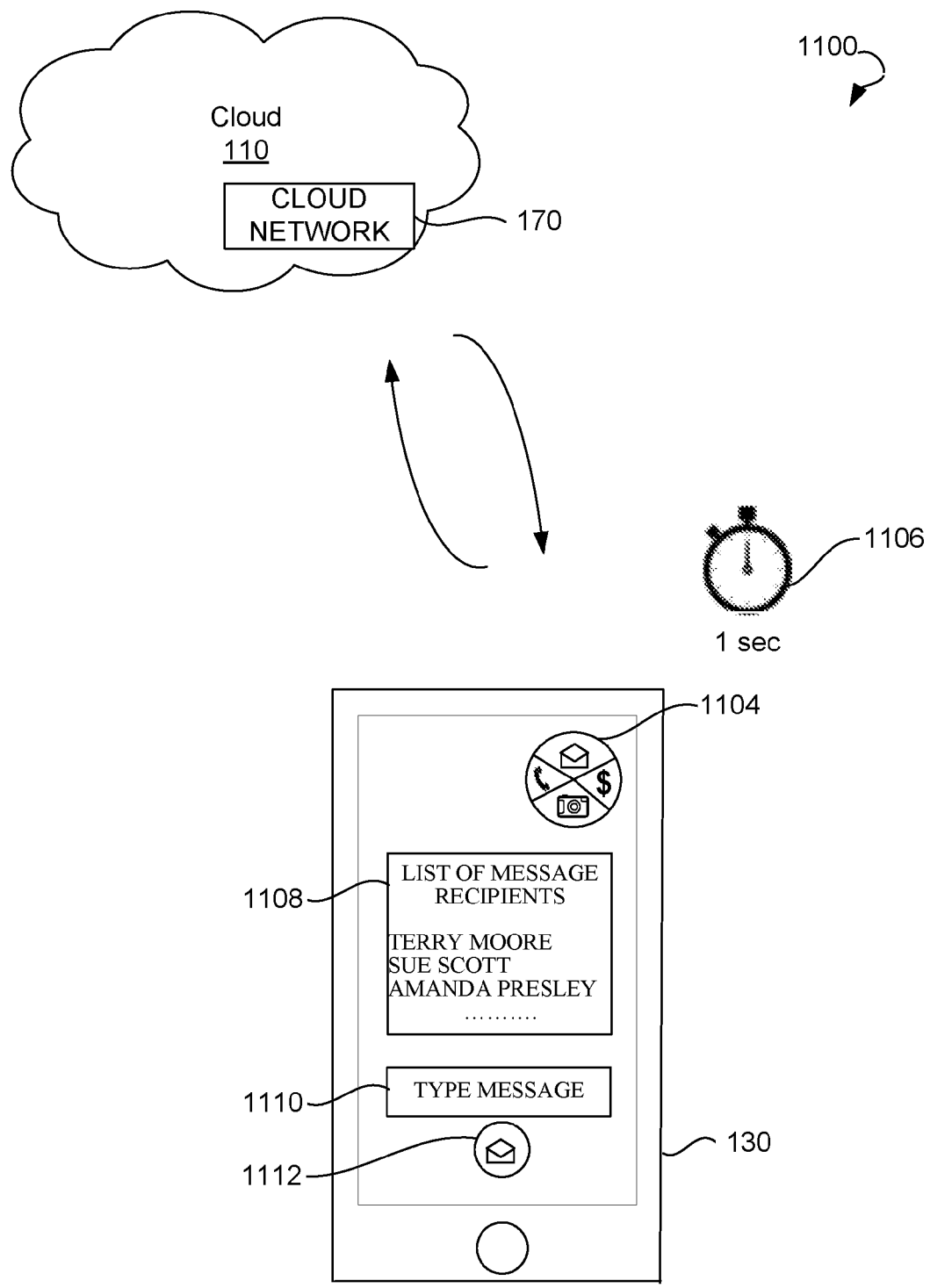
FIG. 11 is a block diagram illustrating a messaging operation using a system for facilitating mobile device payments, multimedia capture, calling, and messaging via a mobile and wearable device, in accordance with an example embodiment.

FIG. 11 is a block diagram 1100 illustrating a messaging operation using a system for facilitating mobile device payments, multimedia capture, calling, and messaging via a mobile and wearable device, in accordance with certain embodiments. The haptic input of the user via the haptic control and the one touch service 1104 may be interpreted as a request to perform the messaging operation according to the duration 1106 of the user input by touching the haptic control and the one touch service 1104. In an example embodiment, an icon 1112 corresponding to the messaging operation may be displayed to show the current operation to the user. Upon initiation of the messaging operation, a list 1108 of call recipients may be displayed. The user may select one of the call recipients from the list 1108. Furthermore, a block 1110 for message text may be displayed. Upon the selection of the message recipient and typing the message text, the message may be sent to the selected message recipient may be initiated.

Figure 12:
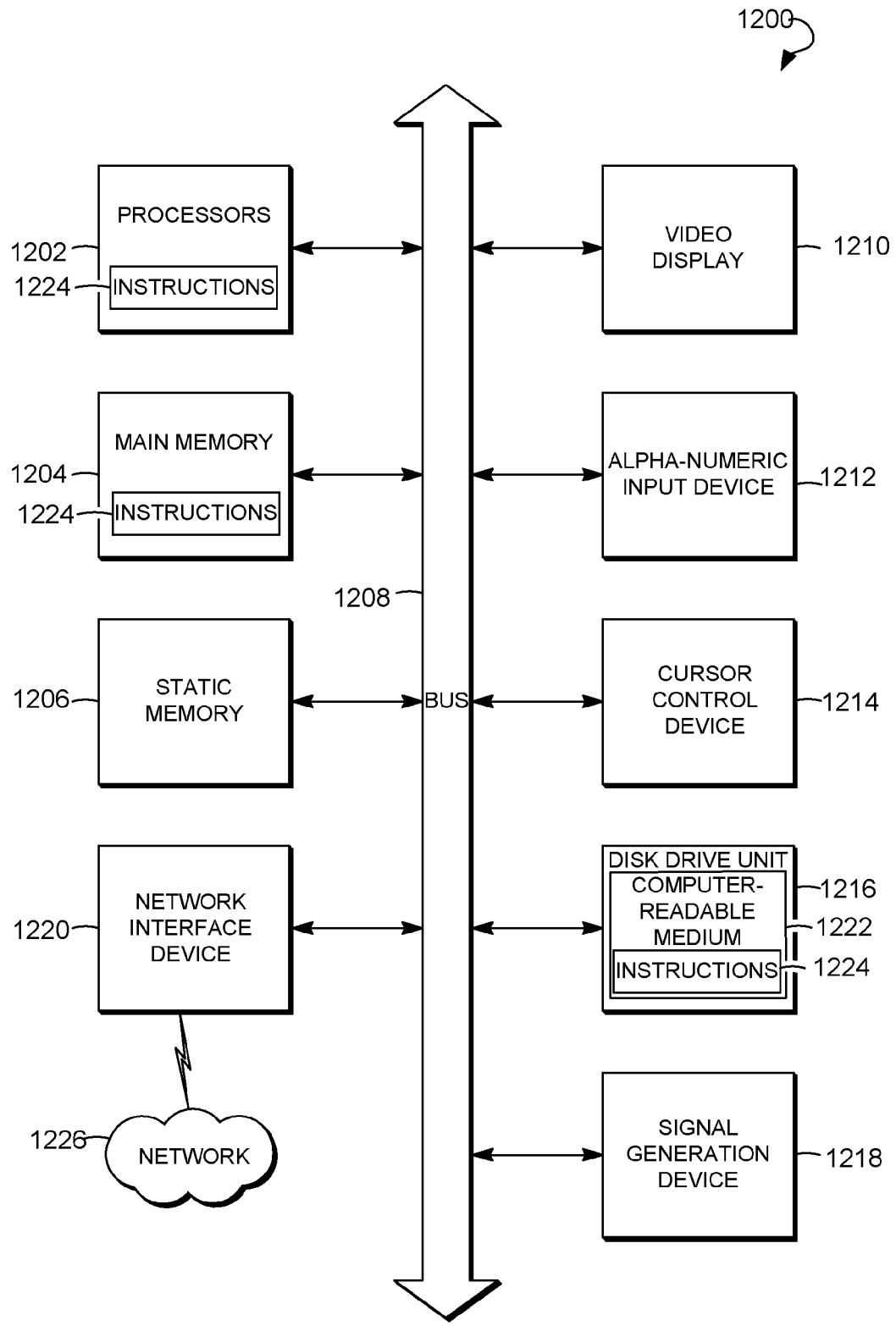
FIG. 12 is a diagrammatic representation of a computing device for a machine in the exemplary electronic form of a computer system, within which a set of instructions for causing the machine to perform any one or more of the methodologies discussed herein can be executed.

FIG. 12 shows a diagrammatic representation of a machine in the example electronic form of a computer system 1200, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor or multiple processors 1202 (e.g., a central processing unit (CPU), a graphics processing unit (GPU), or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 may also include an alphanumeric input device 1212 (e.g., a keyboard), a cursor control device 1214 (e.g., a mouse), a disk drive unit 1216, a signal generation device 1218 (e.g., a speaker) and a network interface device 1220.

The disk drive unit 1216 includes a non-transitory computer-readable medium 1222, on which is stored one or more sets of instructions and data structures (e.g., instructions 1224) embodying or utilized by any one or more of the methodologies or functions described herein. The instructions 1224 may also reside, completely or at least partially, within the main memory 1204 and/or within the processors 1202 during execution thereof by the computer system 1200. The main memory 1204 and the processors 1202 may also constitute machine-readable media.

The instructions 1224 may further be transmitted or received over a network 1226 via the network interface device 1220 utilizing any one of a number of well-known transfer protocols (e.g., Hyper Text Transfer Protocol (HTTP)).

While the computer-readable medium 1222 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAMs), read only memory (ROMs), and the like.

The example embodiments described herein may be implemented in an operating environment comprising software installed on a computer, in hardware, or in a combination of software and hardware.

Thus, various systems and methods for facilitating mobile device payments, multimedia capture, calling, and messaging via a mobile and wearable device have been described. Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

What is claimed is:

1. A method for facilitating mobile device payments, multimedia capture, calling, and messaging via a mobile and wearable device, the method comprising:
   providing, by a processor of the mobile and wearable device, a payment, multimedia capture, calling, and messaging interface on a display of the mobile and wearable device, wherein the payment, multimedia capture, calling, and messaging interface includes a haptic control configured to sense a haptic input of a user, wherein the payment, multimedia capture, calling, and messaging interface is further configured to receive a selection from a list of predetermined operations;
   sensing, by a sensing unit of the mobile and wearable device, the haptic input via the haptic control, wherein the haptic input includes a touch of the user to the haptic control;
   analyzing, by the processor, the haptic input to determine a duration of the haptic input;
   based on the duration of the haptic input, selecting, by the processor, an operation from the list of predetermined operations to be performed by a cloud-based application associated with the mobile and wearable device, wherein the predetermined operations include at least a payment operation, a multimedia capture operation, a calling operation, and a messaging operation, wherein the mobile and wearable device is operable to perform each of the payment operation, the multimedia capture operation, the calling operation, and the messaging operation, wherein the selecting of the payment operation is associated with making a payment request by the user;
   in response to the haptic input, activating, by the processor, the cloud-based application, the cloud-based application running on the mobile and wearable device and being associated with a cloud storage, wherein the cloud-based application is related to one or more dedicated folders provided on one or more client devices associated with the user, the one or more dedicated folders synchronizing across the one or more client devices, and contents of the one or more dedicated folders being accessible via a web resource and the cloud-based application, the cloud-based application including a payment, multimedia capture, calling, and messaging application, wherein the payment, multimedia capture, calling, and messaging application is associated with an application protocol, the application protocol being integrated into a communication platform associated with the mobile and wearable device;
   operably connecting, by the processor, the mobile and wearable device to the cloud storage, wherein the cloud storage is configured to store payment details of the user, the payment details being provided by the user during a first launch of the cloud-based application on the mobile and wearable device;
   in response to the payment operation being selected:
      receiving, by the processor, the payment details associated with the user from the cloud storage, the payment details being used to perform a payment via the mobile and wearable device based on the payment request;
      receiving, by the processor, an indication that the user brings the mobile and wearable device in proximity to a merchant device associated with a merchant to make the payment to the merchant, wherein the indication is received based on sensing an interaction of the mobile and wearable device with the merchant device, wherein the interaction includes at least a near field communication (NFC), wherein the NFC is used to pair the mobile and wearable device and the merchant device upon bringing the mobile and wearable device into proximity to the merchant device, wherein the mobile and wearable device and the merchant device are connected to a cloud network, wherein the payment details and authorizing data associated with the user are stored in the cloud storage associated with the cloud network, wherein upon pairing the mobile and wearable device with the merchant device at least a Bluetooth wireless short range connection between the mobile and wearable device and the merchant device is established;
      based on the interaction, receiving, by the processor, product data and merchant data, the product data and the merchant data being provided by the merchant device, the product data including at least a price of a product associated with the payment;
      prompting, by the processor, the user to provide an authentication information, the prompting includes at least displaying an authentication button on the display of the mobile and wearable device;
      authenticating, by the processor, an identity of the user, the authenticating including at least a biometric authentication, wherein the biometric authentication includes a fingerprint authentication, an iris pattern authentication, a heartbeat authentication, and a vein pattern identification; wherein the vein pattern identification is performed using scanning of one or more of the following: a palm vein pattern, a wrist vein pattern, a hand vein pattern, a leg vein pattern, a foot vein pattern, a neck vein pattern, and a head vein pattern; wherein the fingerprint authentication includes:
      scanning fingerprints of at least one finger of the user when the user touches one or more or the following: the display of the mobile and wearable device, a button of the mobile and wearable device, and a rear panel of the mobile and wearable device; and
      matching the fingerprints to one or more approved fingerprints, the one or more approved fingerprints being stored in the cloud storage;

upon the matching, encrypting, by the processor, the payment request associated with the payment operation to obtain an encrypted payment request, wherein the encrypting of the payment request includes generating, by the processor, a one-time code, the one-time code encoding at least the payment details of the user, the product data, and the merchant data;

transmitting, by the processor, the encrypted payment request to a financial organization;

receiving, by the processor, from the financial organization, a confirmation of the payment from the user to the merchant performed by the financial organization; and storing, by the processor, information associated with the payment to a database of the mobile and wearable device associated with the user;

wherein the payment operation is authorized in part when a geographic location determined by the mobile and wearable device matches a geographic location of the merchant at a time of the selecting of the payment operation;

wherein the selecting the payment operation via the haptic control includes activating, via the cloud-based application associated with the processor of the mobile and wearable device, one or more applications providing one or more of the following services:
  an import and export service for international trade and trade assurance (ITTA) services;
  a service providing customs clearance preparation and assistance in foreign exchange collections;
  an online platform providing professional import and export business process outsourcing (IEBPO) services to cross border trade enterprises and bringing business process operations online for the trade enterprises;
  an online platform for consolidating scattered service resources for cross border trade partners and providing professional services including customs clearance, logistics, trade insurance, financing services and freight forwarding services;
  an e-commerce service providing consumer-to-consumer, business-to-consumer, and business-to-business sales services via web portals;
  a third-party online escrow (TPOE) service, in which buyers verify whether goods they have bought before releasing money to a seller;
  a third-party service providing microcredit very small loans (microloans) to impoverished borrowers who lack collateral, steady employment and a verifiable credit history, wherein designed not only to support entrepreneurship and alleviate;

in response to the multimedia capture operation being selected:
  capturing multimedia by one or more sensors of the mobile and wearable device to obtain captured multimedia, the captured multimedia being stored to the database the mobile and wearable device, wherein the multimedia includes one of more of the following: a text, a photo, a sound, a video, an animation, the geographic location of the mobile and wearable device, and an object being captured by grabbing screenshots of the mobile and wearable device, the screenshots including links including one or more of the following: a Shop Now link, a Book Now link, a Download link, a Learn More link, a Buy Now link, a Pay Now link, and a Sign Up link;
  based on the duration of the of the haptic input associated with the multimedia capture operation, selecting one or more multimedia types for recording from the captured multimedia based on predetermined rules associated with a predetermined time of the providing the haptic control by the user; and
  storing the one or more multimedia types into the database of the mobile and wearable device and the cloud storage;

in response to the calling operation being selected:
  providing, by the processor, a calling interface on the display of the mobile and wearable device, to enable the user to provide, via the calling interface, a call recipient; and
  upon receipt of the call recipient, performing, by the processor, a call with the call recipient via a data network;

in response to the messaging operation being selected:
  providing, by the processor, a messaging interface on the display of the mobile and wearable device to enable the user to provide, via the messaging interface, a message and a selection of a message recipient; and
  upon receipt of the message and the selection of the message recipient, sending, by the processor, the message to the message recipient via the data network;

wherein the cloud-based application is executed by the processor of the mobile and wearable device and is connected to the cloud network and is provided on the mobile and wearable device via one or more of the following: a web browser, a projector, and a hologram;

wherein the cloud-based application is provided for purchasing in one or more applications stores, the one or more applications stores being associated with an operating system, the operating system including one of the following: Microsoft Windows, Linux, Android, Blackberry, iOS, and Windows Phone;

wherein the cloud-based application is provided free of charge or at a predetermined price;

wherein the cloud-based application includes at least a physical card emulation (PCE) client, the PCE client is configured to provide emulation of a physical card to combine physical payment cards with cloud computing and provide an emulated payment card, wherein the physical payment card is emulated based on metadata associated with the user, a phone number associated with the user, and data associated with a point of sale (POS) terminal of the merchant, wherein the PCE client is configured to provide a virtual representation of emulated payment card;

wherein the processor of the mobile and wearable device is configured to run the PCE client, provide two communication paths for NFC commands from the POS terminal based on an application identifier (AID) associated with the PCE client;

wherein the processor is configured to use the AID to route the NFC commands to the cloud-based application managing the emulation of the physical card; and wherein when the user presents the emulated payment card for transaction, an NFC command is routed to the PCE client for verification and authorization using the cloud-based application, wherein the cloud-based application is configured to connect to a backend associated with an issuer of the physical payment card to complete the transaction;

wherein the cloud-based application is associated with a trusted tokenization node, the trusted tokenization node being a shared resource used to generate and de-tokenize tokens representing data associated with the physical payment card at the backend associated with the issuer; and wherein the PCE client provides multi-level security by providing limited use keys, tokenization, device fingerprinting, and dynamic risk analysis, wherein the limited use keys are derived from a master domain key shared by the issuer, wherein a use of the limited use keys is associated with time to live of the limited use keys and a number of transactions to be performed using the limited use keys, wherein the device fingerprints are profiles accosted with the mobile and wearable device and are used to determine that transactions are initiated only by an authorized mobile and wearable device at recognized locations of the POS terminal.

2. The method of claim 1, further comprising:

receiving, from the user, a registration request to register the user in a mobile payment service associated with the cloud-based application, wherein the user sends the registration request via the cloud-based application associated with the mobile and wearable device, the registration request being provided by positioning at least one payment card in proximity to a camera of the mobile and wearable device, capturing, by the camera of the mobile and wearable device, the payment details associated with at least one payment card associated with the user, and parsing the captured payment details, the payment card being selected from one or more of the following: a smart card, a proximity card, an integrated circuit card, a magnetic strip card, a Europay, MasterCard, and Visa (EMV) smart payment card, the payment card storing card data of one or more of debit cards, credit cards, gift cards, loyalty cards, prepaid cards, bank cards, identity cards, and membership cards; and wherein a service provider associated with the mobile payment service and the cloud-based application provides the user with a compensation for future purchases made via the cloud-based application, the compensation being equal to an amount of the payment.

3. The method of claim 1, wherein the cloud-based application includes one or more of the following: a media player, a multimedia library, an online radio broadcaster, an online store selling software applications for the mobile and wearable device, and a mobile and wearable device management application to play, download, purchase, organize multimedia, send multimedia gift cards, and synchronize the multimedia with a portable device and one or more internet-connected devices, wherein the cloud-based application is configured to prompt the user to purchase and download one or more or the following: music, music videos, television shows, audio books, movies, and movie rentals.

4. The method of claim 1, further comprising:

securing the mobile and wearable device via a band to a part of a human body, the part of the human body including one or more of the following: a wrist, an arm, a neck, a bead, a leg, a waist, an ear, and a finger, securing, via the band, the mobile and wearable device being secured under, within or on clothing.

5. The method of claim 1, wherein the payment details include a data related to one or more of the following: a banking account associated with the user, a credit card associated with the user, a debit card associated with the user, a gift card associated with the user, a prepaid card associated with the user, an insurance account associated with the user, mobile currency associated with the user, and a virtual money account of the user, wherein the payment details of the user are linked to a mobile and wearable device number.

6. The method of claim 1, wherein the payment includes an internet payment, a NFC payment, a scan code payment, a person-to-person payment, a buyer-to-merchant payment, a peer-to-peer payment, an in-application payment, a point-of-sale payment, a mobile payment, a wearable payment, and a digital wallet payment;

wherein the selecting the payment operation via the haptic control includes activating, via the cloud-based application, one or more applications providing one or more of the following services: electronic payment services, a shopping search engine, and data-centric cloud computing services;

a third-party online payment platform;

operating worldwide online payments that supports online money transfers;

a payment service for online vendors, auction sites and commercial users, for which it charges a fee.

7. The method of claim 6, wherein the payment is associated with a joint account of the user, the joint account being associated with banks and retailers;

wherein the retailers include one or more of the following organizations: Wal-Mart, Costco, The Kroger Company, Home Depot, Walgreens Boots Alliance Inc, Target, and ETC; and wherein the banks include one or more of the following: Fargo bank, Citibank bank, Industrial and Commercial Bank of China, China Construction Bank, Agricultural Bank of China, Bank of China, Mitsubishi UFJ, HSBC Holdings, JPMorgan Chase, BNP Paribas, Bank of America, and Credit Agricole.

8. The method of claim 7, wherein the joint account is associated with one or more of the following: providing cash rewards for net purchases, wherein the cash rewards remain unexpired until the joint account remains open, a zero percent annual percentage rate for purchases and balance transfers, providing cash rewards for mobile wallet net purchases after opening of the joint account, providing cash back redemption options at automated teller machines, providing deposits into a mobile account and a savings account, providing protection of the joint account, wherein the protection includes fraud monitoring, sending alerts, and zero liability protection, providing a zero annual fee, providing bonuses for the purchases, wherein the bonuses include a predetermined number of flying miles, the flying miles being associated with one or more airlines, booking rooms in one or more hotels.

9. The method of claim 1, further comprising:

prompting the user to log into the cloud-based application and provide a consent to initiate payments on behalf of the user, wherein upon the consent the payments are initiated automatically without requesting the consent of the user, wherein an access to the cloud-based application is performed via initiating one or more of the following: an NFC payment, a Wi-Fi payment, a beacon payment, a mobile payment, and a digital wallet payment.

10. The method of claim 1, wherein the cloud storage is further configured to:

receive an access request and provide access to the multimedia;

provide an access to downloading, uploading, buying, and paying for the multimedia;

store the multimedia, a record of an access made to the multimedia, and content use terms and rules for controlling the access to the multimedia; and provide payment validation data to the mobile and wearable device and one or more internet-connected devices.

11. The method of claim 10, wherein the access is performed via a Wi-Fi network, 3G network, 4G network, 5G network, or 6G network; and wherein the haptic control and the one touch service is integrated with at least one mobile application associated with the mobile and wearable device, wherein the at least one mobile application is integrated into a software development kit and an operating system of the mobile and wearable device, wherein, upon launching of the at least one mobile application by the user, the user is prompted to log in and asked to provide a consent that the at least one mobile application initiates future payments on behalf of the user, wherein during further purchases the at least one mobile application is launched by default without a need for a further action from the user to initiate launching of the at least one mobile application, the further action including entering a login and a password by the user, wherein the at least one mobile application is associated with performing payments and buying products or services in the Internet.

12. The method of claim 1, further comprising:

capturing, by a camera of the mobile and wearable device, one or more product codes associated with one or more products, the one or more product codes including at least a product data associated with the one or more products and a list of the one or more products, the product data being encoded into the one-time code transmitted to the financial organization, wherein the one or more product codes are selected from the following: a barcode, a linear dimensional code, a two-dimensional code, a snap tag code, and a QR code.

13. The method of claim 12, further comprising receiving merchant data based on the one or more product codes, wherein the merchant data is used to determine a loyalty program data of the user, the loyalty program data being associated with a loyalty program of the merchant, the loyalty program data being encoded into the one-time code transmitted to the financial organization.

14. A system for facilitating mobile device payments, multimedia capture, calling, and messaging via a mobile and wearable device, the system comprising:

a processor of the mobile and wearable device configured to:

provide a payment, multimedia capture, calling, and messaging interface on a display of the mobile and wearable device, wherein the payment, multimedia capture, calling, and messaging interface includes a haptic control configured to sense a haptic input of a user, wherein the payment, multimedia capture, calling, and messaging interface is further configured to receive a selection from a list of predetermined operations;

analyze the haptic input to determine a duration of the haptic input;

based on the duration of the haptic input, select an operation from the list of predetermined operations to be performed by a cloud-based application associated with the mobile and wearable device, wherein the predetermined operations include at least a payment operation, a multimedia capture operation, a calling operation, and a messaging operation, wherein the mobile and wearable device is operable to perform each of the payment operation, the multimedia capture operation, the calling operation, and the messaging operation, wherein the selecting of the payment operation is associated with making a payment request by the user;

in response to the haptic input, activate the cloud-based application, the cloud-based application running on the mobile and wearable device and being associated with a cloud storage, wherein the cloud-based application is related to one or more dedicated folders provided on one or more client devices associated with the user, the one or more dedicated folders synchronizing across the one or more client devices, and contents of the one or more dedicated folders being accessible via a web resource and the cloud-based application, the cloud-based application including a payment, multimedia capture, calling, and messaging application, wherein the payment, multimedia capture, calling, and messaging application is associated with an application protocol, the application protocol being integrated into a communication platform associated with the mobile and wearable device;

operably connect the mobile and wearable device to the cloud storage, wherein the cloud storage is configured to store payment details of the user, the payment details being provided by the user during a first launch of the cloud-based application on the mobile and wearable device;

in response to the payment operation being selected:

receive the payment details associated with the user from the cloud storage, the payment details being used to perform a payment via the mobile and wearable device based on the payment request;

receive an indication that the user brings the mobile and wearable device in proximity to a merchant device associated with a merchant to make the payment to the merchant, wherein the indication is received based on sensing an interaction of the mobile and wearable device with the merchant device, wherein the interaction includes at least a near field communication (NFC), wherein the NFC is used to pair the mobile and wearable device and the merchant device upon bringing the mobile and wearable device into proximity to the merchant device, wherein the mobile and wearable device and the merchant device are connected to a cloud network, wherein the payment details and authorizing data associated with the user are stored in the cloud storage associated with the cloud network, wherein upon pairing the mobile and wearable device with the merchant device at least a Bluetooth wireless short range connection between the mobile and wearable device and the merchant device is established;

based on the interaction, receive product data and merchant data, the product data and the merchant data being provided by the merchant device, the product data including at least a price of a product associated with the payment;

prompt the user to provide an authentication information, the prompting includes at least displaying an authentication button on the display of the mobile and wearable device;

authenticate an identity of the user, the authenticating including at least a biometric authentication, wherein the biometric authentication includes a fingerprint authentication, an iris pattern authentication, a heartbeat authentication, and a vein pattern identification; wherein the vein pattern identification is performed using scanning of one or more of the following: a palm vein pattern, a wrist vein pattern, a hand vein pattern, a leg vein pattern, a foot vein pattern, a neck vein pattern, and a head vein pattern; wherein the fingerprint authentication includes:

scanning fingerprints of at least one finger of the user when the user touches one or more or the following: the display of the mobile and wearable device, a button of the mobile and wearable device, and a rear panel of the mobile and wearable device; and matching the fingerprints to one or more approved fingerprints, the one or more approved fingerprints being stored in the cloud storage;

upon the matching, encrypt the payment request associated with the payment operation to obtain an encrypted payment request, wherein the encrypting of the payment request includes generating, by the processor, a one-time code, the one-time code encoding at least the payment details of the user, the product data, and the merchant data;

transmit the encrypted payment request to a financial organization;

receive from the financial organization, a confirmation of the payment from the user to the merchant performed by the financial organization;

wherein the payment operation is authorized in part when a geographic location determined by the mobile and wearable device matches a geographic location of the merchant at a time of the selecting of the payment operation;

wherein the selecting the payment operation via the haptic control includes activating, via the cloud-based application associated with the processor of the mobile and wearable device, one or more applications providing one or more of the following services:

an import and export service for international trade and trade assurance (ITTA) services;

a service providing customs clearance preparation and assistance in foreign exchange collections;

an online platform providing professional import and export business process outsourcing (IEBPO) services to cross border trade enterprises and bringing business process operations online;

an online platform for consolidating scattered service resources for cross border trade partners and providing professional services including customs clearance, logistics, trade insurance, financing services and freight forwarding services;

an e-commerce service providing consumer-to-consumer, business-to-consumer, and business-to-business sales services via web portals;

a third-party online escrow (TPOE) service, in which buyers verify whether goods they have bought before releasing money to a seller;

a third-party service providing microcredit very small loans (microloans) to impoverished borrowers who lack collateral, steady employment and a verifiable credit history, wherein designed not only to support entrepreneurship and alleviate;

in response to the multimedia capture operation being selected:

capture multimedia by one or more sensors of the mobile and wearable device to obtain captured multimedia, the captured multimedia being stored to a database the mobile and wearable device, wherein the multimedia includes one of more of the following: a text, a photo, a sound, a video, an animation, a geographic location, and an object being captured by grabbing screenshots of the mobile and wearable device, the screenshots including links including one or more of the following: a Shop Now link, a Book Now link, a Download link, a Learn More link, a Buy Now link, a Pay Now link, and a Sign Up link;

based on the duration of the of the haptic input associated with the multimedia capture operation, select one or more multimedia types for recording from the captured multimedia based on predetermined rules associated with a predetermined time of the providing the haptic control by the user;

store the one or more multimedia types into the database of the mobile and wearable device and the cloud storage;

in response to the calling operation being selected:

provide a calling interface on the display of the mobile and wearable device, to enable the user to provide, via the calling interface, a call recipient; and upon receipt of the call recipient, perform a call with the call recipient via a data network;

in response to the messaging operation being selected:

provide a messaging interface on the display of the mobile and wearable device to enable the user to provide, via the messaging interface, a message and a selection of a message recipient; and upon receipt of the message and the selection of the message recipient, send the message to the message recipient via the data network;

a sensing unit in communication with the processor being configured to sense the haptic input via the haptic control, wherein the haptic input includes a touch of the user to the haptic control; and a database in communication with the processor, the database being configured to store at least the captured multimedia and the one or more multimedia types;

wherein the cloud-based application is executed by the processor of the mobile and wearable device and is connected to the cloud network and is provided on the mobile and wearable device via one or more of the following: a web browser, a projector, and a hologram;

wherein the cloud-based application is provided for purchasing in one or more applications stores, the one or more applications stores being associated with an operating system, the operating system including one of the following: Microsoft Windows, Linux, Android, Blackberry, iOS, and Windows Phone;

wherein the cloud-based application is provided free of charge or at a predetermined price;

wherein the cloud-based application includes at least a physical card emulation (PCE) client, the PCE client is configured to provide emulation of a physical card to combine physical payment cards with cloud computing and provide an emulated payment card, wherein the physical payment card is emulated based on metadata associated with the user, a phone number associated with the user, and data associated with a point of sale (POS) terminal of the merchant, wherein the PCE client is configured to provide a virtual representation of emulated payment card;

wherein the processor of the mobile and wearable device is configured to run the PCE client, provide two communication paths for NFC commands from the POS terminal based on an application identifier (AID) associated with the PCE client;

wherein the processor is configured to use the AID to route the NFC commands to the cloud-based application managing the emulation of the physical card; and wherein when the user presents the emulated payment card for transaction, an NFC command is routed to the PCE client for verification and authorization using the cloud-based application, wherein the cloud-based application is configured to connect to a backend associated with an issuer of the physical payment card to complete the transaction;

wherein the cloud-based application is associated with a trusted tokenization node, the trusted tokenization node being a shared resource used to generate and de-tokenize tokens representing data associated with the physical payment card at the backend associated with the issuer; and wherein the PCE client provides multi-level security by providing limited use keys, tokenization, device fingerprinting, and dynamic risk analysis, wherein the limited use keys are derived from a master domain key shared by the issuer, wherein a use of the limited use keys is associated with time to live of the limited use keys and a number of transactions to be performed using the limited use keys, wherein the device fingerprints are profiles accosted with the mobile and wearable device and are used to determine that transactions are initiated only by an authorized mobile and wearable device at recognized locations of the POS terminal.

15. The system of claim 14, wherein the processor is further configured to receive, from the user, a registration request to register the user in a mobile payment service associated with the cloud-based application, wherein the user sends the registration request via the cloud-based application associated with the mobile and wearable device, the registration request being provided by capturing, by a camera of the mobile and wearable device, the payment details associated with at least one payment card associated with the user, the payment card being selected from one or more of the following: a smart card, a proximity card, an integrated circuit card, a magnetic strip card, a Europay, MasterCard, and Visa (EMV) smart payment card, the payment card storing card data of one or more of debit cards, credit cards, gift cards, loyalty cards, prepaid cards, bank cards, identity cards, and membership cards; and wherein a service provider associated with the mobile payment service and the cloud-based application provides the user with a compensation for future purchases made via the cloud-based application, the compensation being equal to an amount of the payment.

16. The system of claim 14, wherein the processor is further configured to:

capture, by a camera of the mobile and wearable device, one or more product codes associated with one or more products, the one or more product codes including at least a product data associated with the one or more products and a list of the one or more products, the product data being encoded into the one-time code transmitted to the financial organization, wherein the one or more product codes are selected from the following: a barcode, a linear dimensional code, a two-dimensional code, a snap tag code, and a QR code; and receive merchant data based on the one or more product codes, wherein the merchant data is used to determine a loyalty program data of the user, the loyalty program data being associated with a loyalty program of the merchant, the loyalty program data being encoded into the one-time code transmitted to the financial organization.

17. A non-transitory computer-readable medium comprising instructions, which when executed by one or more processors of a mobile and wearable device, perform the following operations:

provide a payment, multimedia capture, calling, and messaging interface on a display of a mobile and wearable device, wherein the payment, multimedia capture, calling, and messaging interface includes a haptic control configured to sense a haptic input of a user, wherein the payment, multimedia capture, calling, and messaging interface is further configured to receive a selection from a list of predetermined operations;

sense the haptic input via the haptic control, wherein the haptic input includes a touch of the user to the haptic control;

analyze the haptic input to determine a duration of the haptic input;

based on the duration of the haptic input, select an operation from the list of predetermined operations to be performed by a cloud-based application associated with the mobile and wearable device, wherein the predetermined operations include at least a payment operation, a multimedia capture operation, a calling operation, and a messaging operation, wherein the mobile and wearable device is operable to perform each of the payment operation, the multimedia capture operation, the calling operation, and the messaging operation, wherein the selecting of the payment operation is associated with making a payment request by the user;

in response to the haptic input, activate the cloud-based application, the cloud-based application running on the mobile and wearable device and being associated with a cloud storage, wherein the cloud-based application is related to one or more dedicated folders provided on one or more client devices associated with the user, the one or more dedicated folders synchronizing across the one or more client devices, and contents of the one or more dedicated folders being accessible via a web resource and the cloud-based application, the cloud-based application including a payment, multimedia capture, calling, and messaging application, wherein the payment, multimedia capture, calling, and messaging application is associated with an application protocol, the application protocol being integrated into a communication platform associated with the mobile and wearable device;

operably connect the mobile and wearable device to the cloud storage, wherein the cloud storage is configured to store payment details of the user, the payment details being provided by the user during a first launch of the cloud-based application on the mobile and wearable device; in response to the payment operation being selected:

receive the payment details associated with the user from the cloud storage, the payment details being used to perform a payment via the mobile and wearable device based on the payment request;

receive an indication that the user brings the mobile and wearable device in proximity to a merchant device associated with a merchant to make the payment to the merchant, wherein the indication is received based on sensing an interaction of the mobile and wearable device with the merchant device, wherein the interaction includes at least a near field communication (NFC), wherein the NFC is used to pair the mobile and wearable device and the merchant device upon bringing the mobile and wearable device into proximity to the merchant device, wherein the mobile and wearable device and the merchant device are connected to a cloud network, wherein the payment details and authorizing data associated with the user are stored in the cloud storage associated with the cloud network, wherein upon pairing the mobile and wearable device with the merchant device at least a Bluetooth wireless short range connection between the mobile and wearable device and the merchant device is established;

based on the interaction, receive product data and merchant data, the product data and the merchant data being provided by the merchant device, the product data including at least a price of a product associated with the payment;

prompt the user to provide an authentication information, the prompting includes at least displaying an authentication button on a display of the mobile and wearable device;

authenticate an identity of the user, the authenticating including at least a biometric authentication, wherein the biometric authentication includes a fingerprint authentication, an iris pattern authentication, a heartbeat authentication, and a vein pattern identification; wherein the vein pattern identification is performed using scanning of one or more of the following: a palm vein pattern, a wrist vein pattern, a hand vein pattern, a leg vein pattern, a foot vein pattern, a neck vein pattern, and a head vein pattern; wherein the fingerprint authentication includes:

scan fingerprints of at least one finger of the user when the user touches one or more or the following: the display of the mobile and wearable device, a button of the mobile and wearable device, and a rear panel of the mobile and wearable device; and match the fingerprints to one or more approved fingerprints, the one or more approved fingerprints being stored in the cloud storage;

upon the matching, encrypt the payment request associated with the payment operation to obtain an encrypted payment request, wherein the encrypting of the payment request includes generating, by the processor, a one-time code, the one-time code encoding at least the payment details of the user, the product data, and the merchant data;

transmit the encrypted payment request to a financial organization;

receive from the financial organization, a confirmation of the payment from the user to the merchant performed by the financial organization; and store information associated with the payment to a database of the mobile and wearable device associated with the user;

wherein the payment operation is authorized in part when a geographic location determined by the mobile and wearable device matches a geographic location of the merchant at a time of the selecting of the payment operation;

wherein the selecting the payment operation via the haptic control includes activating, via the cloud-based application associated with the processor of the mobile and wearable device, one or more applications providing one or more of the following services:

an import and export service for international trade and trade assurance (ITTA) services;

a service providing customs clearance preparation and assistance in foreign exchange collections;

an online platform providing professional import and export business process outsourcing (IEBPO) services to cross border trade enterprises and bringing business process operations online;

an online platform for consolidating scattered service resources for cross border trade partners and providing professional services including customs clearance, logistics, trade insurance, financing services and freight forwarding services;

an e-commerce service providing consumer-to-consumer, business-to-consumer, and business-to-business sales services via web portals;

a third-party online escrow (TPOE) service, in which buyers verify whether goods they have bought before releasing money to a seller;

a third-party service providing microcredit very small loans (microloans) to impoverished borrowers who lack collateral, steady employment and a verifiable credit history, wherein designed not only to support entrepreneurship and alleviate;

in response to the multimedia capture operation being selected:

capture by one or more sensors of the mobile and wearable device to obtain captured multimedia, the captured multimedia being stored to the database the mobile and wearable device, wherein the multimedia includes one of more of the following: a text, a photo, a sound, a video, an animation, the geographic location of the mobile and wearable device, and an object being captured by grabbing screenshots of the mobile and wearable device, the screenshots including links including one or more of the following: a Shop Now link, a Book Now link, a Download link, a Learn More link, a Buy Now link, a Pay Now link, and a Sign Up link;

based on the duration of the of the haptic input associated with the multimedia capture operation, select one or more multimedia types for recording from the captured multimedia based on predetermined rules associated with a predetermined time of the providing the haptic control by the user; and store the one or more multimedia types into the database of the mobile and wearable device and the cloud storage; in response to the calling operation being selected:

provide a calling interface on the display of the mobile and wearable device, to enable the user to provide, via the calling interface, a call recipient; and upon receipt of the call recipient, perform a call with the call recipient via a data network;

in response to the messaging operation being selected:
provide a messaging interface on the display of the mobile and wearable device to enable the user to provide, via the messaging interface, a message and a selection of a message recipient; and
upon receipt of the message and the selection of the message recipient, send the message to the message recipient via the data network;

wherein the cloud-based application is executed by the processor of the mobile and wearable device and is connected to the cloud network and is provided on the mobile and wearable device via one or more of the following: a web browser, a projector, and a hologram;

wherein the cloud-based application is provided for purchasing in one or more applications stores, the one or more applications stores being associated with an operating system, the operating system including one of the following: Microsoft Windows, Linux, Android, Blackberry, iOS, and Windows Phone;

wherein the cloud-based application is provided free of charge or at a predetermined price;

wherein the cloud-based application includes at least a physical card emulation (PCE) client, the PCE client is configured to provide emulation of a physical card to combine physical payment cards with cloud computing and provide an emulated payment card, wherein the physical payment card is emulated based on metadata associated with the user, a phone number associated with the user, and data associated with a point of sale (POS) terminal of the merchant, wherein the PCE client is configured to provide a virtual representation of emulated payment card;

wherein the processor of the mobile and wearable device is configured to run the PCE client, provide two communication paths for NFC commands from the POS terminal based on an application identifier (AID) associated with the PCE client;

wherein the processor is configured to use the AID to route the NFC commands to the cloud-based application managing the emulation of the physical card; and wherein when the user presents the emulated payment card for transaction, an NFC command is routed to the PCE client for verification and authorization using the cloud-based application, wherein the cloud-based application is configured to connect to a backend associated with an issuer of the physical payment card to complete the transaction;

wherein the cloud-based application is associated with a trusted tokenization node, the trusted tokenization node being a shared resource used to generate and de-tokenize tokens representing data associated with the physical payment card at the backend associated with the issuer; and wherein the PCE client provides multi-level security by providing limited use keys, tokenization, device fingerprinting, and dynamic risk analysis, wherein the limited use keys are derived from a master domain key shared by the issuer, wherein a use of the limited use keys is associated with time to live of the limited use keys and a number of transactions to be performed using the limited use keys, wherein the device fingerprints are profiles accosted with the mobile and wearable device and are used to determine that transactions are initiated only by an authorized mobile and wearable device at recognized locations of the POS terminal.

* * * * *